(12) United States Patent
Wronski et al.

(10) Patent No.: US 10,001,270 B2
(45) Date of Patent: Jun. 19, 2018

(54) HOUSINGS AND RELATED COMPONENTS FOR LUMINAIRES

(71) Applicant: Cooper Technologies Company, Houston, TX (US)

(72) Inventors: Grzegorz Wronski, Peachtree City, GA (US); Jared Michael Davis, Newnan, GA (US); Huang Rongxiu, Shanghai (CN)

(73) Assignee: Cooper Technologies Company, Houston, TX (US)

( * ) Notice: Subject to any disclaimer, the term of this patent is extended or adjusted under 35 U.S.C. 154(b) by 249 days.

(21) Appl. No.: 14/879,695

(22) Filed: Oct. 9, 2015

(65) Prior Publication Data
US 2016/0033123 A1 Feb. 4, 2016

Related U.S. Application Data

(63) Continuation-in-part of application No. 14/740,964, filed on Jun. 16, 2015, which is a continuation of
(Continued)

(51) Int. Cl.
| | |
|---|---|
| *F21V 31/00* | (2006.01) |
| *F16J 15/02* | (2006.01) |
| *F21V 15/01* | (2006.01) |
| *F21V 17/12* | (2006.01) |
| *H02G 3/20* | (2006.01) |
| *F21S 8/02* | (2006.01) |

(Continued)

(52) U.S. Cl.
CPC .......... *F21V 31/005* (2013.01); *F16J 15/027* (2013.01); *F21S 8/02* (2013.01); *F21V 15/01* (2013.01); *F21V 17/12* (2013.01); *H02G 3/20* (2013.01); *F21S 8/026* (2013.01); *F21V 21/048* (2013.01); *F21V 23/001* (2013.01); *F21V 31/00* (2013.01)

(58) Field of Classification Search
CPC ........ F21V 31/005; F21V 15/01; F21V 17/12; F21V 21/048; F21V 23/001
See application file for complete search history.

(56) References Cited

U.S. PATENT DOCUMENTS

| | | |
|---|---|---|
| 2,515,390 A | 7/1950 | Appleton |
| 3,112,891 A | 12/1963 | Cutler |

(Continued)

OTHER PUBLICATIONS

Thomas Lighting; Product specification; PS5 5" Recessed Housing; Dec. 26, 2013.
(Continued)

*Primary Examiner* — Anne Hines
(74) *Attorney, Agent, or Firm* — King & Spalding LLP

(57) ABSTRACT

A housing for a luminaire is disclosed. The housing can include a housing top and a housing body coupled to each other. The housing body can include at least one wall that is bendable to form a cavity. The housing body can also include at least one first housing body coupling feature disposed on a first end, and at least one second complementary housing body coupling feature disposed on the first end adjacent to the at least one first housing body coupling feature. The housing body can further include at least one second housing body coupling feature disposed on a second end, and at least one first complementary housing body coupling feature disposed on the second end adjacent to the at least one second housing body coupling feature.

20 Claims, 21 Drawing Sheets

Related U.S. Application Data application No. 14/242,396, filed on Apr. 1, 2014, now Pat. No. 9,062,837.

(60) Provisional application No. 61/891,284, filed on Oct. 15, 2013, provisional application No. 61/809,167, filed on Apr. 5, 2013.

(51) Int. Cl.
*F21V 23/00* (2015.01)
*F21V 21/04* (2006.01)

(56) References Cited

U.S. PATENT DOCUMENTS

| | | | |
|---|---|---|---|
| 3,130,949 A | 4/1964 | Wolff | |
| 3,422,261 A | 1/1969 | McGinty | |
| 3,675,807 A | 7/1972 | Lund | |
| 4,216,411 A | 8/1980 | Ehret | |
| 4,338,577 A | 7/1982 | Sato | |
| 4,366,344 A | 12/1982 | Sheehan | |
| 4,400,766 A | 8/1983 | Munson | |
| 4,450,512 A | 5/1984 | Kristofek | |
| 4,635,172 A | 1/1987 | Steinke | |
| 4,685,037 A | 8/1987 | Akiyama | |
| 4,754,377 A | 6/1988 | Wenman | |
| 4,768,800 A | 9/1988 | Johns | |
| 4,803,603 A | 2/1989 | Carson | |
| 4,835,667 A | 5/1989 | Wolfe | |
| 4,930,054 A | 5/1990 | Krebs | |
| 5,075,831 A | 12/1991 | Stringer | |
| 5,200,575 A | 4/1993 | Sheehan | |
| 5,372,269 A | 12/1994 | Sutton et al. | |
| 5,374,812 A | 12/1994 | Chan et al. | |
| 5,452,816 A | 9/1995 | Chan et al. | |
| 5,457,617 A | 10/1995 | Chan et al. | |
| 5,562,343 A | 10/1996 | Chan et al. | |
| 5,690,423 A | 11/1997 | Hentz | |
| 5,836,678 A | 11/1998 | Wright | |
| 5,957,572 A | 9/1999 | Wedekind et al. | |
| 5,957,573 A | 9/1999 | Wedekind et al. | |
| 6,034,326 A | 3/2000 | Jorgensen | |
| 6,089,732 A | 7/2000 | Wright et al. | |
| 6,369,326 B1 | 4/2002 | Rippel et al. | |
| 6,588,922 B1 | 7/2003 | DeCicco | |
| 6,872,885 B1 | 3/2005 | Newbold, Jr. | |
| 7,220,923 B1 | 5/2007 | Sheehan | |
| 7,473,005 B2 | 1/2009 | O'Brien | |
| 7,530,705 B2 | 5/2009 | Czech et al. | |
| 7,530,717 B2 | 5/2009 | Magisano et al. | |
| 7,784,754 B2 | 8/2010 | Nevers et al. | |
| 7,993,037 B1 | 8/2011 | Buse | |
| 8,444,302 B1 | 5/2013 | Barboza et al. | |
| 9,140,435 B2 | 9/2015 | Yaphe | |
| 9,447,950 B1 | 9/2016 | Wronski | |
| 2003/0095413 A1 | 5/2003 | Jamison | |
| 2007/0131827 A1 | 6/2007 | Nevers | |
| 2007/0139921 A1 | 6/2007 | Wu | |
| 2009/0231861 A1 | 9/2009 | Wedekind | |
| 2009/0231862 A1 | 9/2009 | Seo | |
| 2012/0044703 A1 | 2/2012 | Wilson | |
| 2012/0287616 A1 | 11/2012 | Wilcox | |

OTHER PUBLICATIONS

Thomas Lighting; Product specification; PS5RM; 5" Recessed Housing; Jun. 12, 2013.
Thomas Lighting; Product specification; PS1RM; 6" Recessed Housing; Jun. 12, 2013.
Thomas Lighting; Product specification; PS1 6" Recessed Housing; Jun. 12, 2013.
Juno Lighting; Product specification; 6" Deluxe Universal TC Remodel Housing; TC2R; Aug. 2009.
Juno Lighting; Product specification; 6" Economy Universal IC Remodel Housing; IC22R; Oct. 2009.
Juno Lighting; Product specification; 6" Vertical IC Compact Fluorescent Housing; ICPL618E; Aug. 2012.
Philips Lightolier; Product specification; Lytening LED; Oct. 2012.
Progress Lighting; Product specification; 5" Shallow Housing IC, Non-IC & Air-Tight; Nov. 2001.
Progress Lighting; Product specification; 6" Housing IC, Non-IC & Air-Tight; Nov. 2013.
Progress Lighting; Product specification; 6" Housing IC, Non-IC & Air-Tight w/Quick Connects; Nov. 2013.
Progress Lighting; Product specification; 6" Housing IC, Non-IC; Mar. 2006.
Nora Lighting; Product specification; NHRIC-504QAT; 5" IC Air-Tight Line Voltage Remodel Housing; Jan. 2, 2004.
Nora Lighting; Product specification; NHRIC-501QAT; 5" IC Housing; Jan. 2, 2002.
WAC Lighting; Product specification; R-602D-N-ICA; 6" Line Voltage New Construction Housing 120V-IC Rated—Airtight Ready; Apr. 2014.
WAC Lighting; Product specification; R-603D-R-ICA; 6" Line Voltage Remodel Housing 120V-IC Rated—Airtight Ready; Apr. 2014.
Prescolite; LiteBox-Light Commercial and Residential Downlights; Catalog; Jan. 2009.
Prescolite; LiteBox 6"; Product specification; New Construction DBXMRI; Mar. 22, 2011.
Lithonia Lighting; Residential Recessed Downlighting Guide; Feb. 2014.

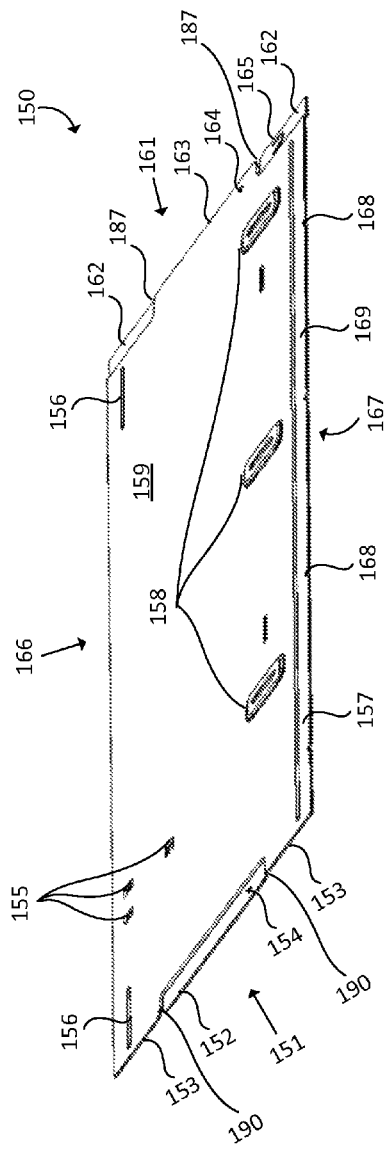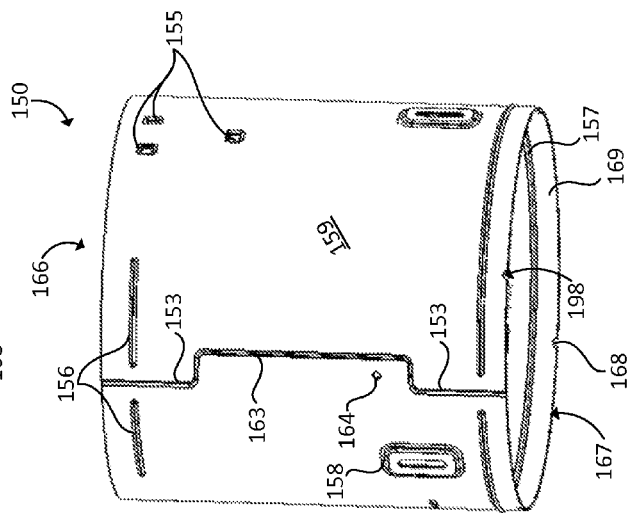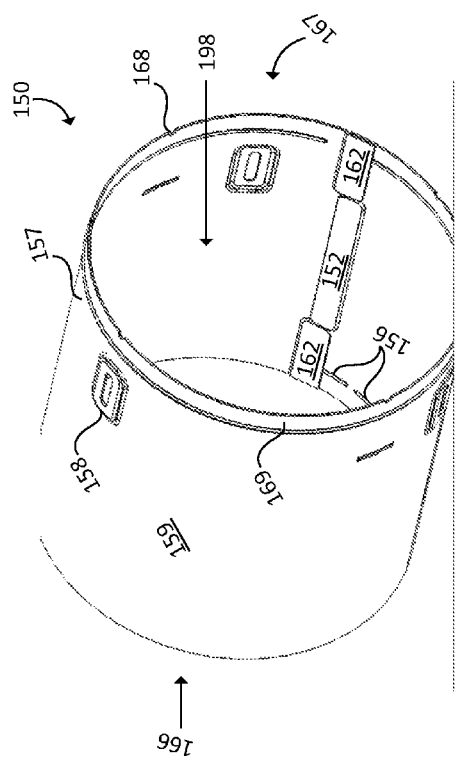

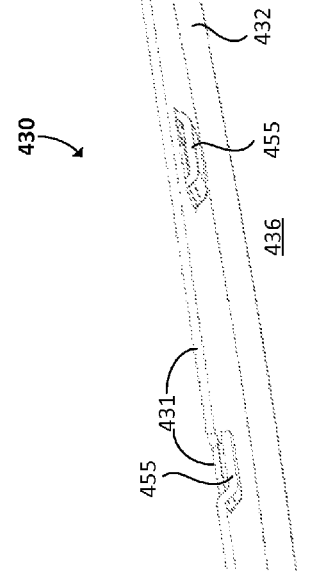
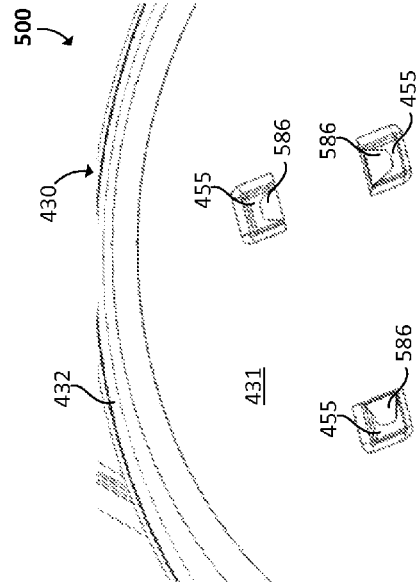
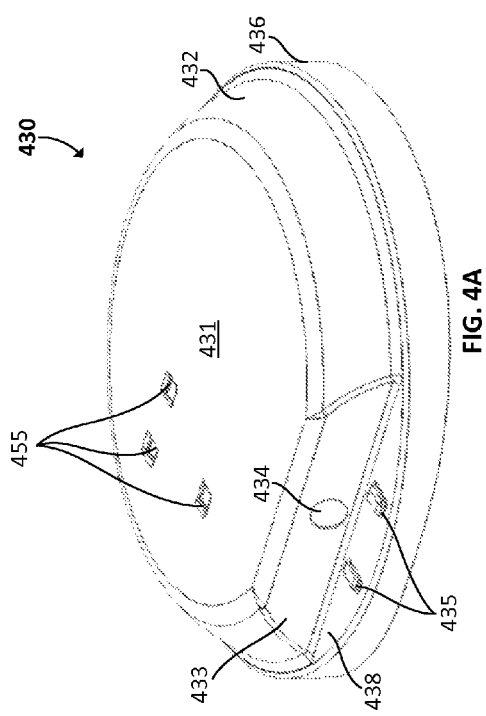
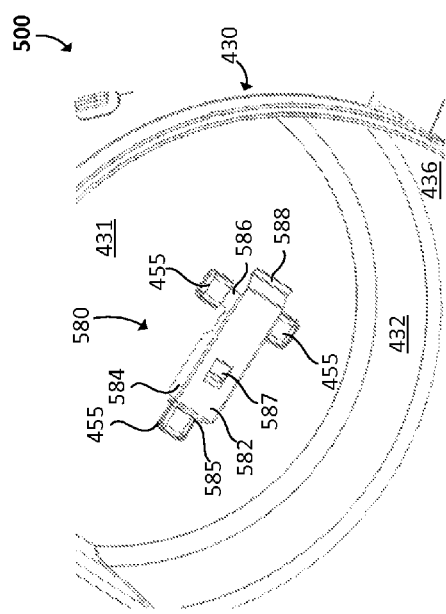

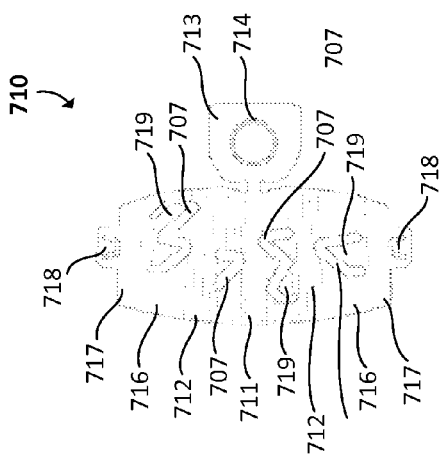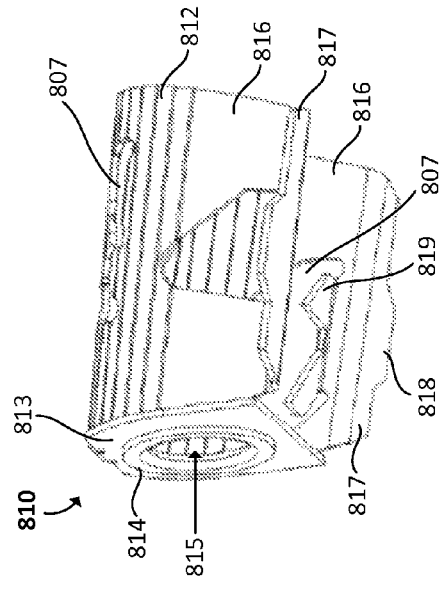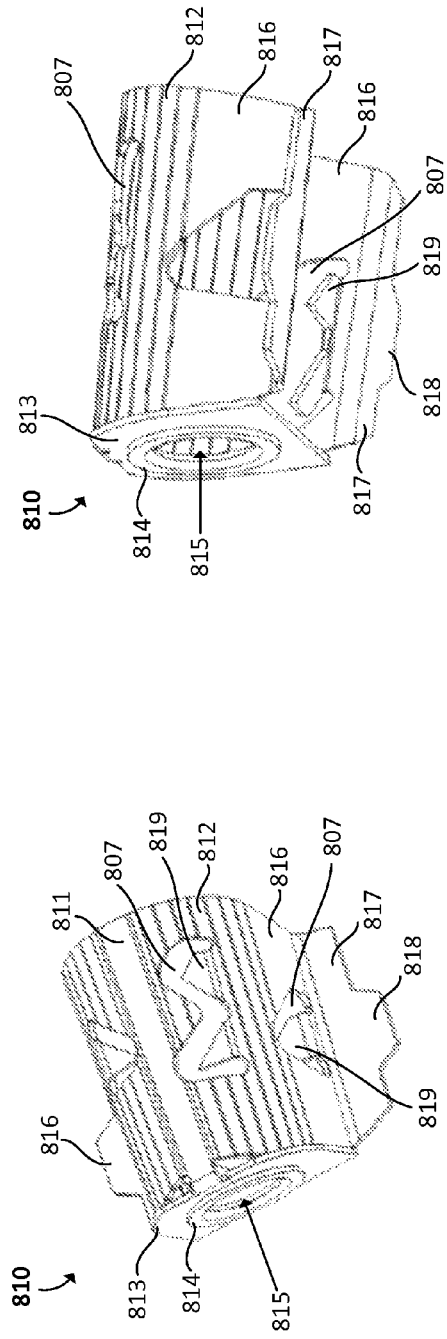

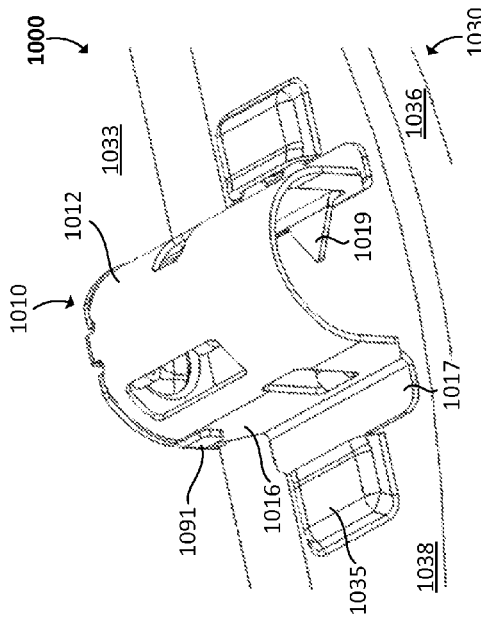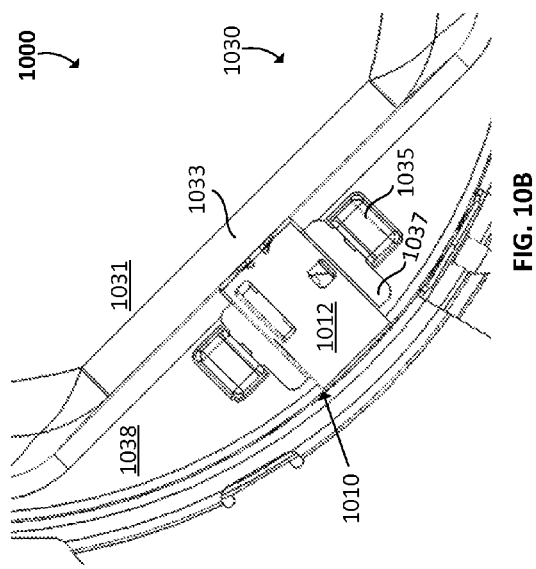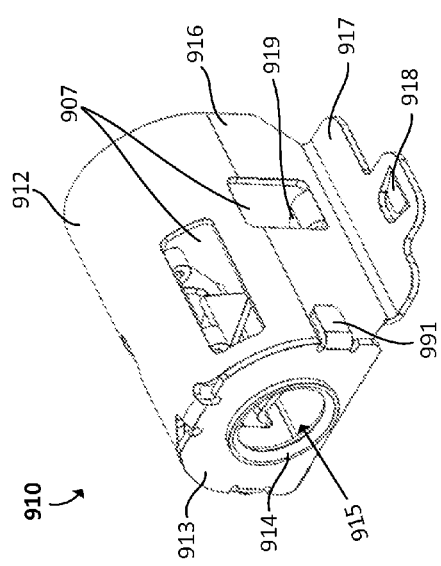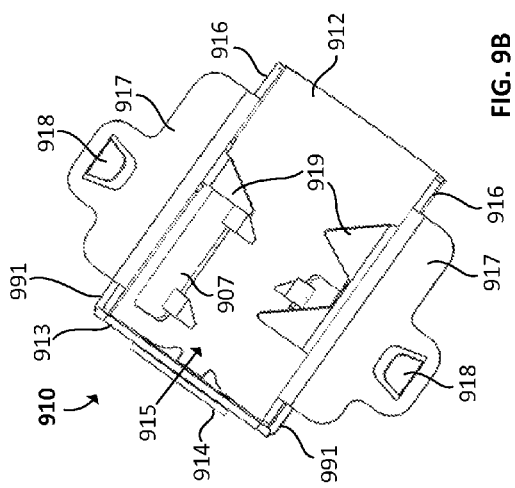

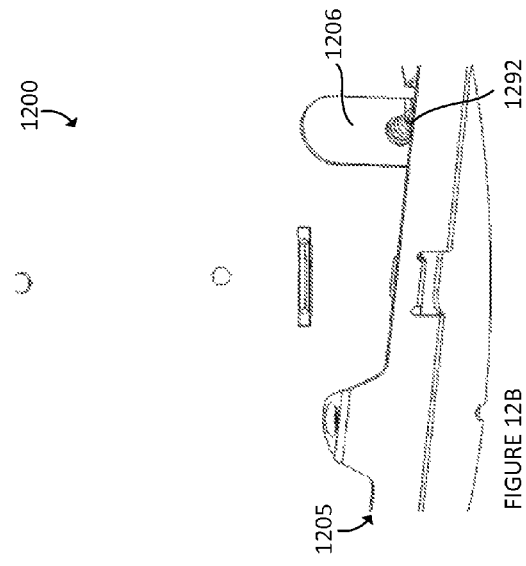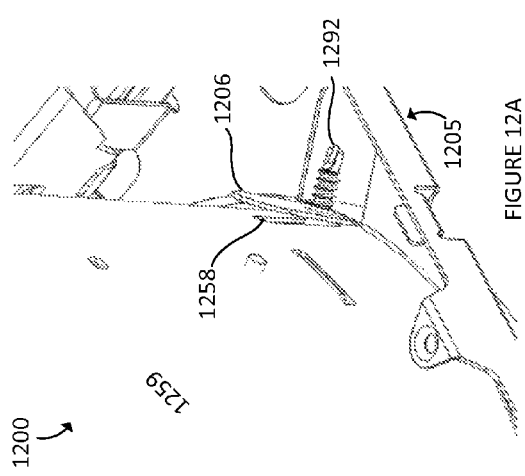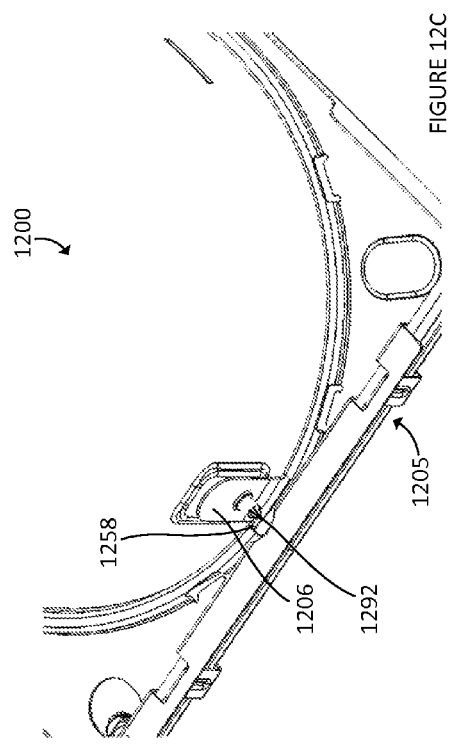

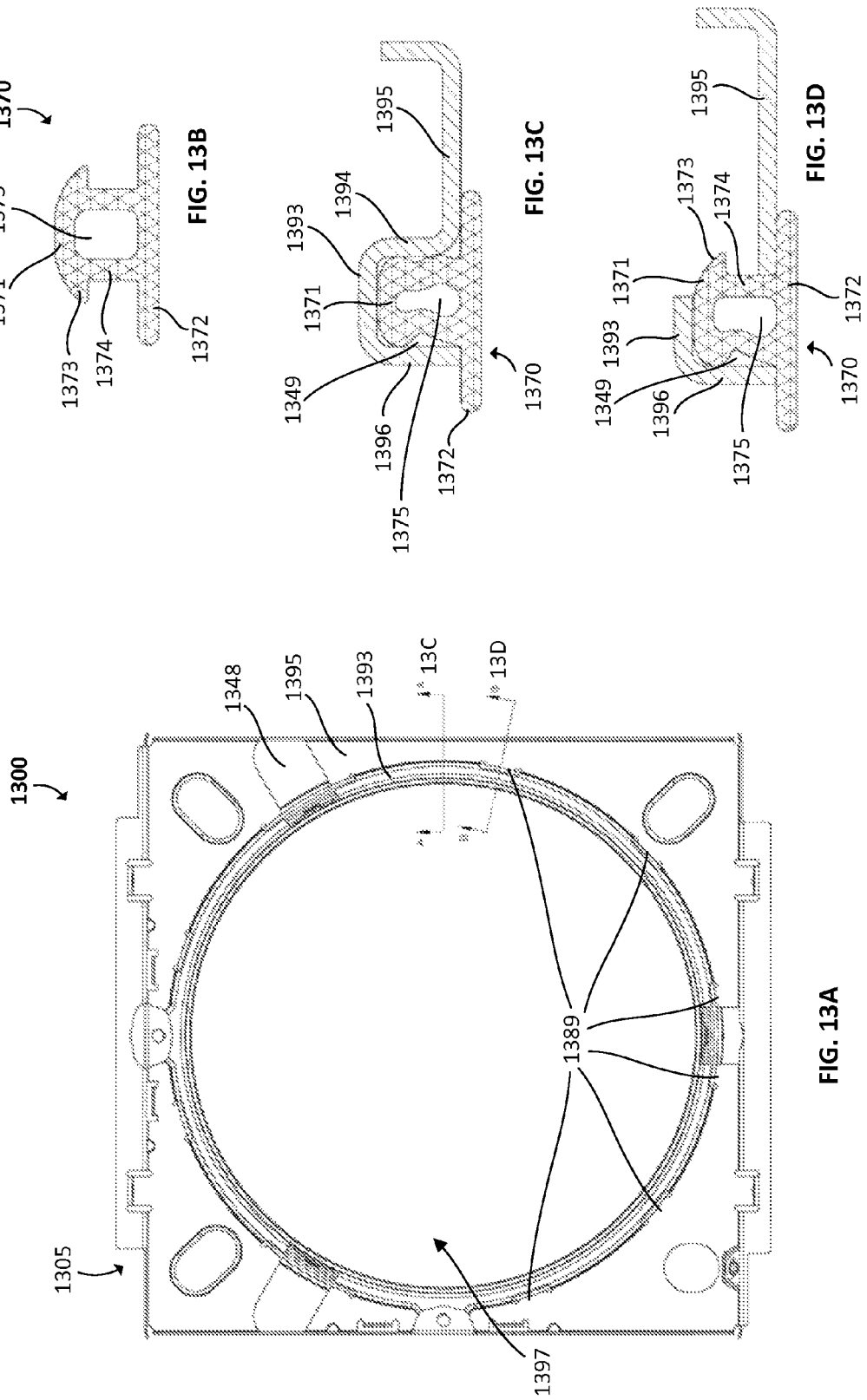

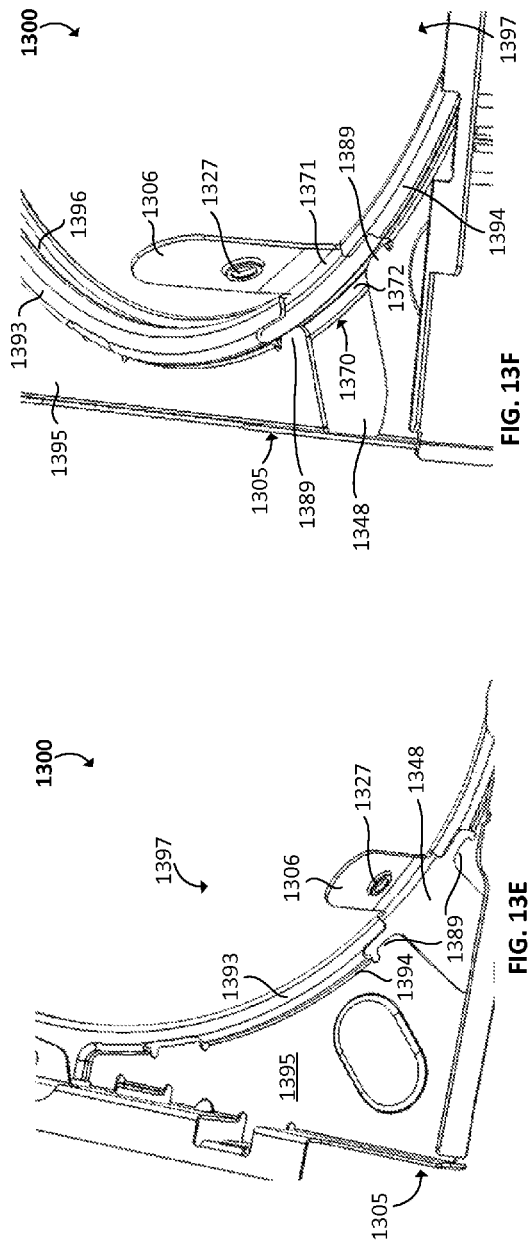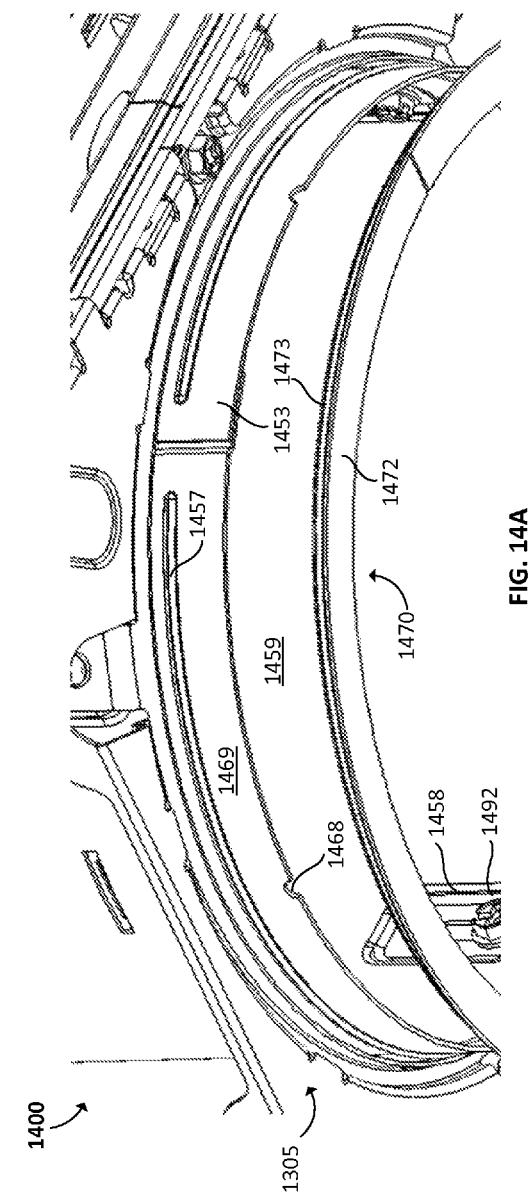

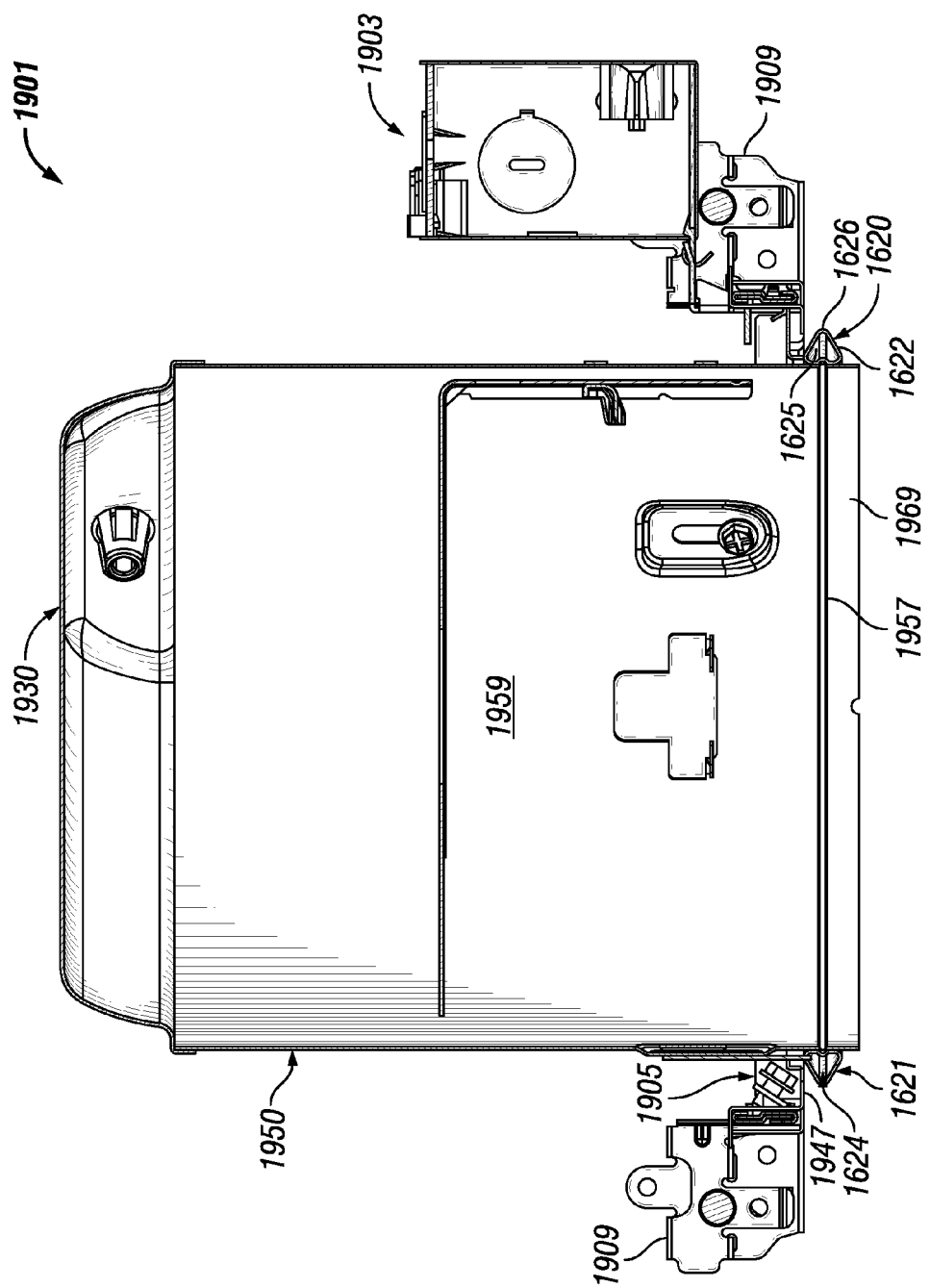

HOUSINGS AND RELATED COMPONENTS FOR LUMINAIRES

CROSS-REFERENCE TO RELATED APPLICATIONS

This application is a continuation-in-part application of and claims priority to U.S. patent application Ser. No. 14/740,964, titled "Housings and Related Components For Luminaires", filed on Jun. 16, 2015, which is a continuation application of, and claims priority under 35 U.S.C. § 120 to, U.S. patent application Ser. No. 14/242,396, titled "Housings and Related Components For Luminaires", filed on Apr. 1, 2014, which itself claims priority under 35 U.S.C. § 119 to (1) U.S. Provisional Patent Application Ser. No. 61/809,167, titled "Next Generation Luminaire", filed on Apr. 5, 2013, and (2) U.S. Provisional Patent Application Ser. No. 61/891,284, titled "Rotatable Junction Box Assembly, Interconnecting Luminaire Housing Ends and Luminaire Retention", filed on Oct. 15, 2013. The entire contents of all of the above-referenced applications are hereby incorporated herein by reference.

TECHNICAL FIELD

Embodiments described herein relate generally to housings, and more particularly to systems, methods, and devices for housings and related components for luminaires.

BACKGROUND

Recessed light fixtures are used in many residential, commercial, and industrial applications. Generally, the space in which to install a recessed light fixture is limited, and so the time to install a recessed light fixture can be increased when parts of the light fixture (e.g., the luminaire, the luminaire housing) are cumbersome to install.

SUMMARY

In general, in one aspect, the disclosure relates to a housing for a luminaire. The housing can include a housing top and a housing body mechanically coupled to the housing top. The housing body of the housing can include at least one wall that is bendable to form a cavity, where the at least one wall has a first end and a second end. The housing body of the housing can also include at least one first housing body coupling feature disposed on the first end of the at least one first wall. The housing body of the housing can further include at least one second complementary housing body coupling feature disposed on the first end adjacent to the at least one first housing body coupling feature. The housing body of the housing can also include at least one second housing body coupling feature disposed on the second end of the at least one wall. The housing body of the housing can further include at least one first complementary housing body coupling feature disposed on the second end adjacent to the at least one second housing body coupling feature. The first housing body coupling feature and the first complementary housing body coupling feature can be configured to mechanically couple to each other. The second housing body coupling feature and the second complementary housing body coupling feature can be configured to mechanically couple to each other.

In another aspect, the disclosure can generally relate to a luminaire. The luminaire can include a frame having at least one housing coupling feature. The luminaire can also include a housing mechanically coupled to the frame. The housing of the luminaire can include a housing top and a housing body mechanically coupled to the housing top. The housing body of the housing of the luminaire can include at least one first wall that is bendable to form a first cavity, where the at least one first wall has a first end and a second end. The housing body of the housing of the luminaire can also include at least one first housing body coupling feature disposed on the first end of the at least one first wall. The housing body of the housing of the luminaire can further include at least one second complementary housing body coupling feature disposed on the first end adjacent to the at least one first housing body coupling feature. The housing body of the housing of the luminaire can also include at least one second housing body coupling feature disposed on the second end of the at least one first wall. The housing body of the housing of the luminaire can further include at least one first complementary housing body coupling feature disposed on the second end adjacent to the at least one second housing body coupling feature. The housing body of the housing of the luminaire can also include at least one frame coupling feature disposed toward a bottom end of the at least one first wall. The first housing body coupling feature and the first complementary housing body coupling feature can be mechanically coupled to each other. The second housing body coupling feature and the second complementary housing body coupling feature can be mechanically coupled to each other. The at least one housing coupling feature of the frame and the at least one frame coupling feature of the housing body can be mechanically coupled to each other.

In yet another aspect, the disclosure can generally relate to a flex connector. The flex connector can include at least one wall forming a cavity. The at least one wall of the flex connector can include a top having a curvature and at least one first conduit coupling feature configured to abut against a first portion of a conduit disposed in the cavity. The at least one wall of the flex connector can also include at least one side having at least one second conduit coupling feature configured to abut against a second portion of the conduit disposed in the cavity. The at least one wall of the flex connector can further include at least one bottom having a housing coupling feature, where the housing coupling feature is configured to mechanically couple to a complementary coupling feature disposed on a housing and create an air-tight seal therebetween. The flex connector can also include an end having a collar, where the collar is configured to be disposed within an aperture of the housing.

These and other aspects, objects, features, and embodiments will be apparent from the following description and the appended claims.

BRIEF DESCRIPTION OF THE DRAWINGS

The drawings illustrate only example embodiments of housings and related components for luminaires (also called light fixtures) and are therefore not to be considered limiting of its scope, as housings and related components for luminaires may admit to other equally effective embodiments. The elements and features shown in the drawings are not necessarily to scale, emphasis instead being placed upon clearly illustrating the principles of the example embodiments. Additionally, certain dimensions or positionings may be exaggerated to help visually convey such principles. In the drawings, reference numerals designate like or corresponding, but not necessarily identical, elements.

FIGS. 2A-2C show various views of a body of a housing in accordance with certain example embodiments.

FIGS. 4A and 4B show various views of another housing top in accordance with certain example embodiments.

FIGS. 5A and 5B show various views of a thermal protector case coupled to a portion of a housing in accordance with certain example embodiments.

FIGS. 7A-7C show various views of a flex connector in accordance with certain example embodiments.

FIGS. 8A and 8B show various views of another flex connector in accordance with certain example embodiments.

FIGS. 9A and 9B show various views of yet another flex connector in accordance with certain example embodiments.

FIGS. 10A-10F show various views of a flex connector coupled to a housing in accordance with certain example embodiments.

FIGS. 12A-12C show various views of complementary coupling features of the housing and frame of a luminaire in accordance with certain example embodiments.

FIGS. 13A-13F show various views of a sealing member integrated with a frame in accordance with certain example embodiments.

FIGS. 14A-14C show various views of a sealing member integrated with a housing and a frame in accordance with certain example embodiments.

FIGS. 19A-19D show a luminaire that includes the sealing member of FIGS. 16A and 16B in accordance with certain example embodiments.

DETAILED DESCRIPTION OF EXAMPLE EMBODIMENTS

Figure 1:
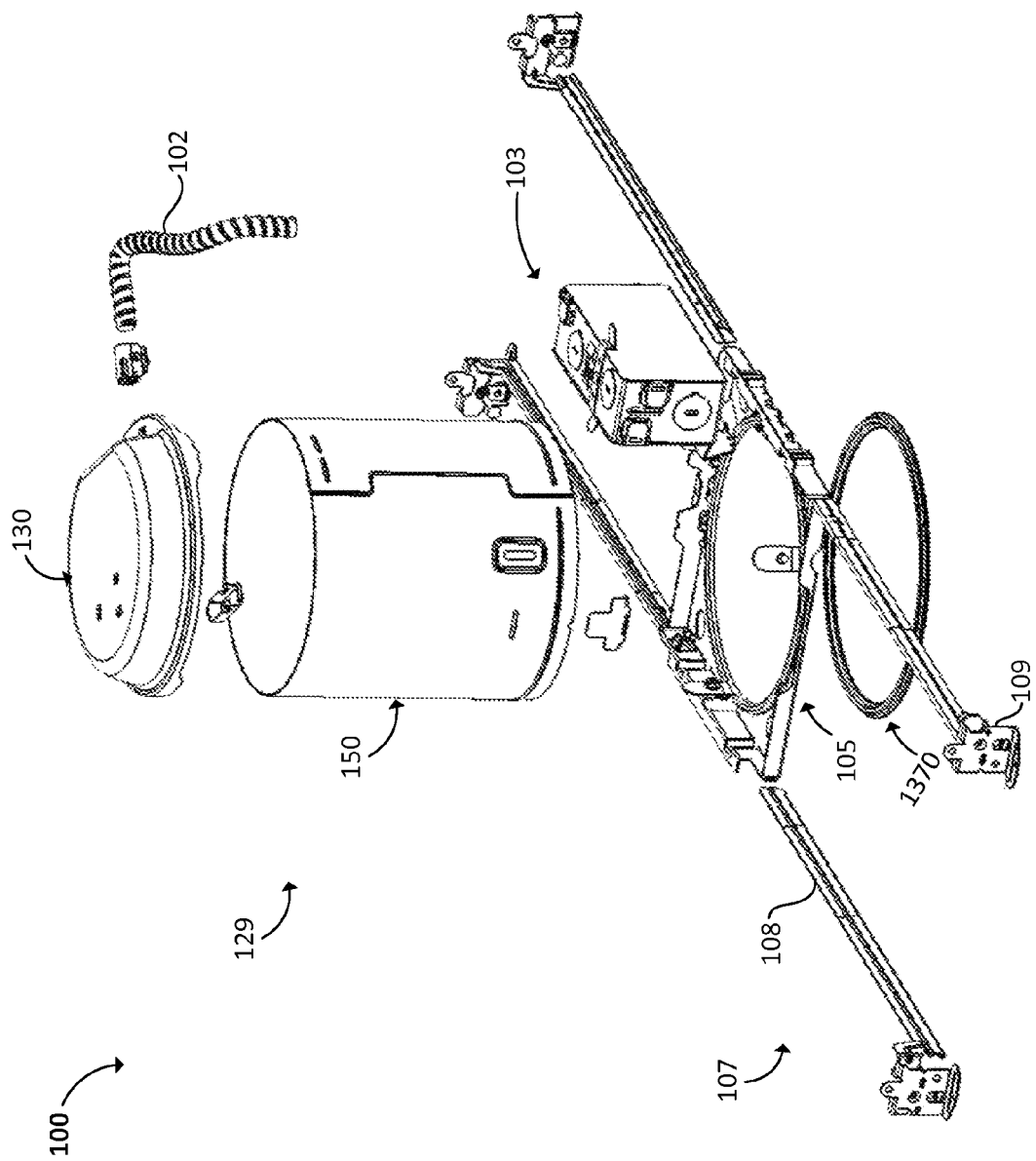
FIG. 1 shows an exploded view of a luminaire that includes a housing in accordance with certain example embodiments.

The example embodiments discussed herein are directed to systems, apparatuses, and methods of housings and related components for luminaires. While the Figures shown and described herein are directed to luminaires, example housings and/or related components can also be used in other applications aside from luminaires, including but not limited to motor control centers, relay cabinets, and enclosures. Thus, the examples of housings and related components described herein are not limited to luminaires.

With respect to luminaires, while the example embodiments described herein are directed to recessed luminaires, example embodiments (or portions thereof) can also be used for non-recessed luminaires. Example luminaires can be used with one or more of a number of different types of lighting systems, including but not limited to light-emitting diode (LED) lighting systems, fluorescent lighting systems, organic LED lighting systems, incandescent lighting systems, and halogen lighting systems. Therefore, example embodiments described herein should not be considered limited to any particular type of lighting system.

Any example housing, flex connector, thermal protector case, or other related components (or portions (e.g., features) thereof) described herein can be made from a single piece (as from a mold). When an example housing or related component (or portion thereof) is made from a single piece, the single piece can be cut out, bent, stamped, and/or otherwise shaped to create certain features, elements, or other portions of a component. For example, as discussed below, at least a portion of the flex connector can be made from a single sheet where various portions are cut out, bent, shaped, and otherwise manipulated to form an example flex connector.

Alternatively, an example housing or related component (or portions thereof) can be made from multiple pieces that are mechanically coupled to each other. In such a case, the multiple pieces can be mechanically coupled to each other using one or more of a number of coupling methods, including but not limited to epoxy, welding, fastening devices, compression fittings, mating threads, and slotted fittings. One or more pieces that are mechanically coupled to each other can be coupled to each other in one or more of a number of ways, including but not limited to fixedly, hingedly, removeably, slidably, and threadably.

Components and/or features described herein can include elements that are described as coupling, fastening, securing, aligning, or other similar terms. Such terms are merely meant to distinguish various elements and/or features within a component or device and are not meant to limit the capability or function of that particular element and/or feature. For example, a feature described as a "coupling feature" can couple, secure, fasten, align, and/or perform other functions aside from merely coupling. In addition, each component and/or feature described herein can be made of one or more of a number of suitable materials, including but not limited to metal, rubber, and plastic.

A coupling feature (including a complementary coupling feature) as described herein can allow one or more components and/or portions of an example housing and/or related component to become mechanically coupled, directly or indirectly, to a portion (e.g., a junction box, a frame) of a luminaire and/or to another portion of the housing and/or related component. A coupling feature can include, but is not limited to, a portion of a hinge, an aperture (as shown), a slot, a spring clip, a tab, a detent, and a mating thread. An example housing and/or related component can be coupled to a frame, a housing, and/or another component of a luminaire by the direct use of one or more coupling features. In addition, or in the alternative, an example housing and/or related component can be coupled to a junction box, a frame, and/or another component of a luminaire using one or more independent devices that interact with one or more coupling features disposed on the example housing, one or more related components, and/or other component of a luminaire. Examples of such devices can include, but are not limited to, a pin, a hinge, a fastening device (e.g., a bolt, a screw, a rivet), and a spring. One coupling feature described herein can be the same as, or different than, one or more other coupling features described herein.

As described herein, a user can be any person that interacts with an example housing and/or related component, or a portion thereof. Examples of a user may include, but are not limited to, an engineer, an electrician, a maintenance technician, a mechanic, an operator, a consultant, a contractor, a homeowner, and a manufacturer's representative.

The components of example housings and/or related components described herein can be physically placed in outdoor environments. In addition, or in the alternative, example housings and/or related components can be subject to extreme heat, extreme cold, moisture, humidity, high winds, dust, and other conditions that can cause wear on the housings and/or related components, or components thereof. In certain example embodiments, the components of housings and/or related components, as well as any coupling (e.g., mechanical, electrical) between such components, are made of materials that are designed to maintain a long-term useful life and to perform when required without mechanical failure.

In one or more example embodiments, one or more components of a luminaire is subject to meeting certain standards and/or requirements. For example, the American Society of Testing and Materials (ASTM) creates, maintains, and publishes standards that apply to luminaires. For example, the ASTM publishes ASTM E283-04, which is a standard test method for determining rate of air leakage through exterior windows, curtain walls, and doors under specified pressure differences across the specimen. The ASTM E283-04 standard also defines that "air tight" is a net airflow of less than 2.0 cubic feet per minute (CFM) at a differential pressure of 1.57 pounds per square foot (PSF).

Examples of other authorities setting standards and/or regulations that can apply to example luminaires can include, but are not limited to, the National Electric Code (NEC), the Canadian Electric Code (CEC), the International Energy Conservation Code (IECC), and Underwriter's Laboratories (UL). As used herein, an air-tight seal describes a seal between two or more coupling features of an example luminaire that allows the luminaire to meet ASTM E283-04 and/or any equivalent thereof. In other words, the term "air-tight seal" used herein is not taken literally, but rather is defined in context of ASTM E283-04 and/or any equivalent thereof, such as described in the previous paragraph.

Any component described in one or more figures herein can apply to any subsequent figures having the same label. In other words, the description for any component of a subsequent (or other) figure can be considered substantially the same as the corresponding component described with respect to a previous (or other) figure. The numbering scheme for the components in the figures herein parallel the numbering scheme for the components of previously described figures in that each component is a three or four digit number having either the identical last two digits.

Any seal between two or more components (or two or more portions of a component) of a luminaire described herein can be an environmental seal. An environmental seal can restrict some or all of a number of elements (e.g., dust, moisture) from penetrating the seal, making the seal "air tight". Such a seal can create a pressurized environment, or the seal can allow some minimal amount of air to pass therethrough.

Example embodiments of housings and related components of luminaires will be described more fully hereinafter with reference to the accompanying drawings, in which example embodiments of housings and related components of luminaires are shown. Housings and related components of luminaires may, however, be embodied in many different forms and should not be construed as limited to the example embodiments set forth herein. Rather, these example embodiments are provided so that this disclosure will be thorough and complete, and will fully convey the scope of housings and related components of luminaires to those of ordinary skill in the art. Like, but not necessarily the same, elements (also sometimes called components) in the various figures are denoted by like reference numerals for consistency.

Terms such as "first," "second," "third", "fourth", "top," "bottom," "side," "distal", "left," and "right" are used merely to distinguish one component (or part of a component or state of a component) from another. Such terms are not meant to denote a preference or a particular orientation. Also, the names given to various components described herein are descriptive of example embodiments and are not meant to be limiting in any way. Those skilled in the art will appreciate that a feature and/or component shown and/or described in one embodiment (e.g., in a figure) herein can be used in another embodiment (e.g., in any other figure) herein, even if not expressly shown and/or described in such other embodiment.

FIG. 1 shows an exploded view of an example luminaire 101 in accordance with certain example embodiments. In one or more embodiments, one or more of the components shown in FIG. 1 may be omitted, added, repeated, and/or substituted. Accordingly, embodiments of luminaires with example housings and/or related components should not be considered limited to the specific arrangements of components shown in FIG. 1.

Referring to FIG. 1, the luminaire 101 can include a housing 129 (which can include, for example, a housing body 150 (sometimes called a can 150) and a housing top 130 (sometimes called a can top 130), a housing 150 (sometimes called a can 150)), flexible conduit 102, a frame 105, a junction box 103, a sealing member 1370, and an optional mounting feature 107. The optional mounting feature 107 can have any features and configurations to mount the rest of the luminaire 101 to one or more structures (e.g., a wall, a ceiling, a piece of wood, a post). In this example, the mounting feature 107 includes one or more hanger bars 108 and one or more hanger bar fasteners 109. An optional hanger bar fastener 109 can be mechanically coupled to each end of a hanger bar 108 and can be mechanically coupled to a surface (e.g., a wall, a piece of wood, a metal frame, a concrete pillar) that is used to support the luminaire 101.

The housing body 150 of the housing can have any shape and/or size appropriate for mechanically coupling to the frame 105. The housing body 150 can be used to enclose one or more of a number of components of the luminaire 101. Such components can include, but are not limited to, a power source (e.g., a driver, a ballast), one or more light sources, a fan, and a lens. The housing body 150 can be mechanically coupled to the housing top 130, disposed at the top and/or at some other location on the housing body 150, to provide access within the housing body 150. The example housing body 150 and housing top 130 are described in more detail below with respect to FIGS. 2A-4B.

In certain example embodiments, the flexible conduit 102 is coupled to both the junction box 103 and a portion of the housing 129. For example, in this case, the flexible conduit 102 is mechanically coupled to the housing top 130 of the housing 129. The flexible conduit 102 can be any component that is capable of containing (hosting) one or more electrical wires. In such a case, the flexible conduit 102 can protect the one or more electrical wires disposed therein from elements (e.g., dirt, moisture) and/or physical harm (e.g., pinching). In some cases, some or all of the flexible conduit 102 is rigid rather than flexible.

Such electrical wires can be used to provide power and/or control between the junction box 103 and the housing 129. Thus, at least part of the electrical wire is disposed in the junction box 103, part is disposed in the flexible conduit 102, and part is disposed in the housing 129. As the name implies, the flexible conduit 102 is bendable and movable so that one or more components of the luminaire 101, including the flexible conduit 102, can be repositioned or otherwise moved without becoming decoupled from the junction box 103 and the housing 129. The junction box 103 can include one or more of a number of components, including but not limited to terminal blocks, electrical devices, and other electrical wires.

In certain example embodiments, the frame 105 is formed from a single piece. Alternatively, the frame 105 can be an assembly of two or more frame pieces that are shaped and sized to couple to each other to form the frame 105. The frame 105 can be mechanically coupled to one or more hanger bars 108 (or other mounting features 107) so that the hanger bars 108 extend from the frame 105 in one or more directions. In addition, or in the alternative, the frame 105 can be directly coupled to a mounting surface to support the luminaire 101. The frame 105 can have any shape and/or size suitable for the housing 129.

Figure 15A:
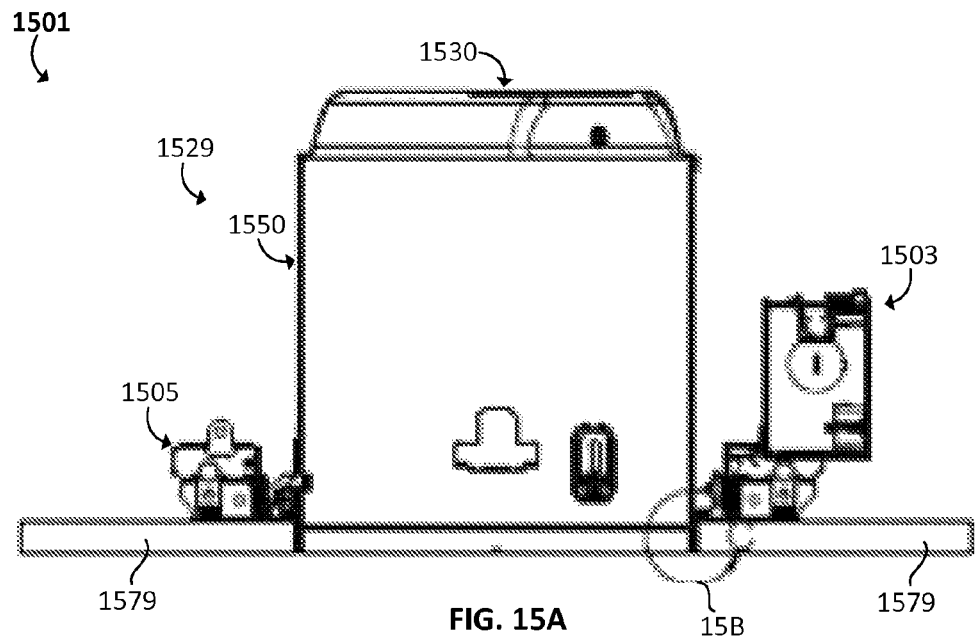
FIGS. 15A and 15B show various views of a luminaire installed in a ceiling in accordance with certain example embodiments.
Figure 15B:
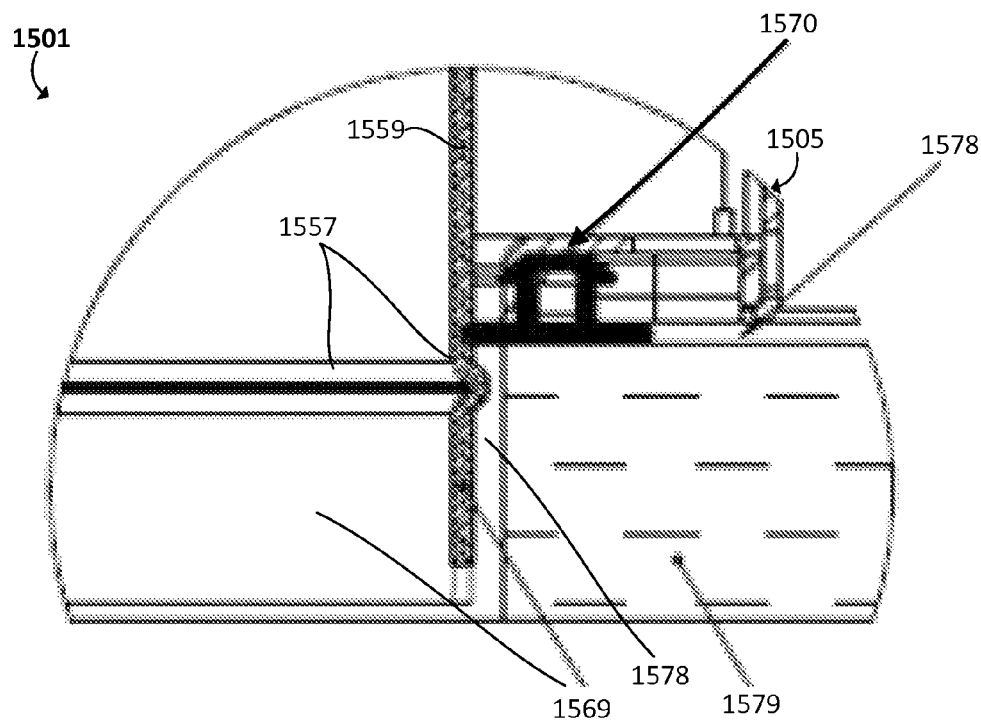

In certain example embodiments, one or more portions (e.g., sides) of the frame 105 can include one or more complementary coupling features that receive and/or otherwise couple to one or more coupling features of the junction box 103. The sealing member 1370, described in more detail below with respect to FIGS. 13A-13F, can be used to reduce or eliminate external elements (e.g., moisture, dust) from entering inside the housing 129. In addition, or in the alternative, the sealing member 1370 can be used to seal a gap between the frame 105 and the housing 129. Further, as shown in FIGS. 15A and 15B, the sealing member 1370 can reduce or prevent air flow between an external surface (e.g., a ceiling) and the outside of the frame 105 and/or housing 129.

FIGS. 2A-2C show various views of an example housing body 150 of a luminaire in accordance with certain example embodiments. FIG. 2A shows a perspective view of the housing body 150 as a flat sheet. FIGS. 2B and 2C show perspective views of the housing body 150 in its normal form. In one or more embodiments, one or more of the components shown in FIGS. 2A-2C may be omitted, added, repeated, and/or substituted. Accordingly, embodiments of a housing body should not be considered limited to the specific arrangements of components shown in FIGS. 2A-2C.

Referring to FIGS. 1-2C, in certain example embodiments, the housing body 150 has at least one wall 159 that forms a cavity 198. As described, one or more components of the luminaire 101 can be disposed inside the cavity 198 of the housing body 150. The housing body 150 can include a top end 166, a bottom end 167, a left end 151, and a right end 161. The housing body 150 can include one or more of a number of coupling features that can be used to mechanically couple to another portion of the housing body 150 and/or to another component of the luminaire 101. The wall 159 of the housing body 150 can be bendable, such that the housing body 150 can be formed into one or more of a number of shapes. In certain example embodiments, at least one portion of the housing body 150 can be pre-formed to exemplify the shape (e.g., curvature) of the housing body 150.

For example, as shown in FIGS. 2A-2C, the housing body 150 can include one or more coupling features 152 (also called housing body coupling features 152) and/or one or more coupling features 162 (also called housing body coupling features 162). Each coupling feature 152 and each coupling feature 162 can be used, directly or indirectly, to mechanically couple one part of the housing body 150 to another part of the housing body 150. In this example, the coupling feature 152 and the coupling features 162 can be used to mechanically couple the left end 151 and the right end 161 of the housing body 150 to each other.

In this case, as shown in FIGS. 2A-2C, the coupling feature 152 is a tab disposed on the distal end of the left end 151. The coupling feature 152 can be positioned between (e.g., substantially centered between) two left end portions 153, which can also be tabs. In certain example embodiments, an open-ended notch 190 is disposed between coupling feature 152 and each end portion 153. The coupling feature 152 can be vertically offset relative to the left end portions 153. In this example, the left end portions 153 are substantially planar with the wall 159 of the housing body 150, while the coupling feature 152 is recessed lower (when viewing the housing body 150 from the outer surface) relative to the left end portions 153. Similarly, the coupling features 162 in this case is a tab disposed on the distal end of the right end 161. The coupling features 162 can be positioned on either side of a right end portion 163, which can also be tabs. In certain example embodiments, an open-ended notch 187 is disposed between the right end portion 163 and each coupling feature 162. The coupling features 162 can be vertically offset relative to the right end portion 163. In this example, the right end portion 163 is substantially planar with the wall 159 of the housing body 150, while the coupling features 162 are recessed lower (when viewing the housing body 150 from the outer surface) relative to the right end portion 163.

In certain example embodiments, the length and width of the coupling feature 152 is substantially the same as the length and width of the right end portion 163. Similarly, the length and width of the coupling features 162 can be substantially the same as the length and width of the left end portion 153. The open-ended notches 187 and the open-ended notches 190 engage with each other, which causes the top of the coupling feature 152 to abut against (mechanically couple to) the bottom of the right end portion 163 (also called a complementary coupling feature), and the top of the coupling features 162 to abut against the bottom of the left end portions 153 (also called a complementary coupling features), which can create an air-tight seal therebetween. For the open-ended notches 187 and the open-ended notches 190 to engage with each other, causing the coupling feature 152 to abut against the right end portion 163 and for the coupling features 162 to abut against the left end portions 152, the housing body 150 can be bent or otherwise shaped so that these features align with each other.

The amount that the coupling feature 152 is vertically offset relative to the left end portions 153 can be substantially the same as the amount that the coupling features 162 are vertically offset relative to the right end portion 163. In such a case, when the open-ended notches 187 and the open-ended notches 190 to engage with each other, causing the coupling feature 152 to abut against the right end portion 163 and the coupling features 162 to abut against the left end portions 153, a tight seal is formed along the height of the housing body 150 between the left end 151 and the right end 161.

In such a case, one or more of the coupling feature 152, the left end portions 153, the coupling features 162, and/or the right end portions 163 can include one or more other coupling feature to help secure the left end 151 of the housing body 150 to the right end 161. For example, as shown in FIGS. 2A-2C, the coupling feature 152 and the right end portion 163 can each have an aperture that traverses therethrough. In such a case, the aperture 154 in the coupling feature 152 and the aperture 164 in the right end portion 163 can have a shape and size substantially the same to each other. Further, the position of the aperture 154 on the coupling feature 152 and the position of the aperture 164 in the right end portion 163 can be such that the aperture 154 and the aperture 164 are substantially aligned with each other when the coupling feature 152 is mechanically coupled to the right end portion 163. Another coupling device (e.g., a screw, a rivet) can be traverse the aperture 154 and the aperture 164 to secure the coupling feature 152 to the right end portion 163.

As another example, at least one of the coupling features 162 can have a coupling feature 165 (e.g., a recessed area, a protrusion) disposed thereon. Similarly, at least one of the left end portions 153 can have a coupling feature (e.g., a protrusion, a recessed area) (hidden from view in this case) that complements the coupling feature 165 and is aligned with the coupling feature 165 when the coupling features 162 are mechanically coupled to the left end portions 153.

In certain example embodiments, the thickness of the various coupling features (e.g., coupling feature 152, coupling feature 162) along the left end 151 and the right end 161 have a thickness that is substantially the same as the thickness of the wall 159. In such a case, one or more coupling features (in this example, coupling feature 152) along the left end 151 can be recessed relative to the one or more other coupling features (in this example, coupling features 153) along the left end 151. Similarly, one or more coupling features (in this example, coupling feature 162) along the right end 161 can be recessed relative to the one or more other coupling features (in this example, coupling features 163) along the right end 161. In this way, when the coupling feature 152 and the coupling feature 162 are mechanically coupled to each other and when the coupling features 153 and the coupling features 163 are mechanically coupled to each other, the outer surface of the housing body 150 can be substantially uniform around its perimeter.

The housing body 150 can also include one or more coupling features for mechanically coupling the housing body 150 to another component of the luminaire 101. In such cases, an air-tight seal can be formed between the coupling features. For example, as shown in FIGS. 2A-2C, the housing body 150 can include a coupling feature 157 (also called a sealing member coupling feature 157 or a protrusion 157) for mechanically coupling the sealing member 1370 to the housing body 150, which can create an air-tight seal therebetween. In this case, the coupling feature 157 is a protrusion that extends some or all of the outer perimeter of the wall 159 and is disposed toward the bottom end 167. More information about the sealing member 1370 is described below with respect to FIGS. 13A-14C.

In certain example embodiments, the coupling feature 157 separates a lower wall 169 from the wall 159. The lower wall 169 can have can have one or more aligning features 168 disposed along its outer edge. Such aligning features 168 in this case are a recess in the outer edge of the lower wall 169.

The aligning features 168 can be used, for example, to align the luminaire 101 to one or more adjacent luminaires.

As another example, one or more coupling features 156 (also called housing top coupling features 156) for mechanically coupling the housing top 130 to the housing body 150, which can create an air-tight seal therebetween. In this case, the coupling features 156 is a protrusion that extends some or all of the outer perimeter of the wall 159 and is disposed toward the top end 166. Additional details about the coupling features 156 are provided below with respect to FIGS. 3A and 3B As yet another example, one or more coupling features 155 (also called thermal protector case coupling features 155) can be disposed on the wall 159 of the housing body 150, which can create an air-tight seal therebetween. In this example, as shown in FIGS. 2A-2C, the coupling features 155 can be a number of apertures can traverse the thickness of the wall 159. The coupling features 155 can be used to receive and couple to a thermal protector case (e.g., protector case 680) or some other component of the luminaire 101. Examples of a thermal protector case is described below with respect to FIGS. 5A-6.

As still another example, one or more coupling features 158 (also called frame coupling features 158) can be disposed on the wall 159 of the housing body 150. In this example, as shown in FIGS. 2A-2C, the coupling features 158 can be a number of shaped protrusions each having one or more apertures (e.g., holes, slots) disposed therein, where each aperture traverses the thickness of the wall 159 (including the protrusion of the coupling feature 158). The coupling features 158 can be used to receive and couple to a portion of the frame 105, which can create an air-tight seal therebetween.

Figure 3A:
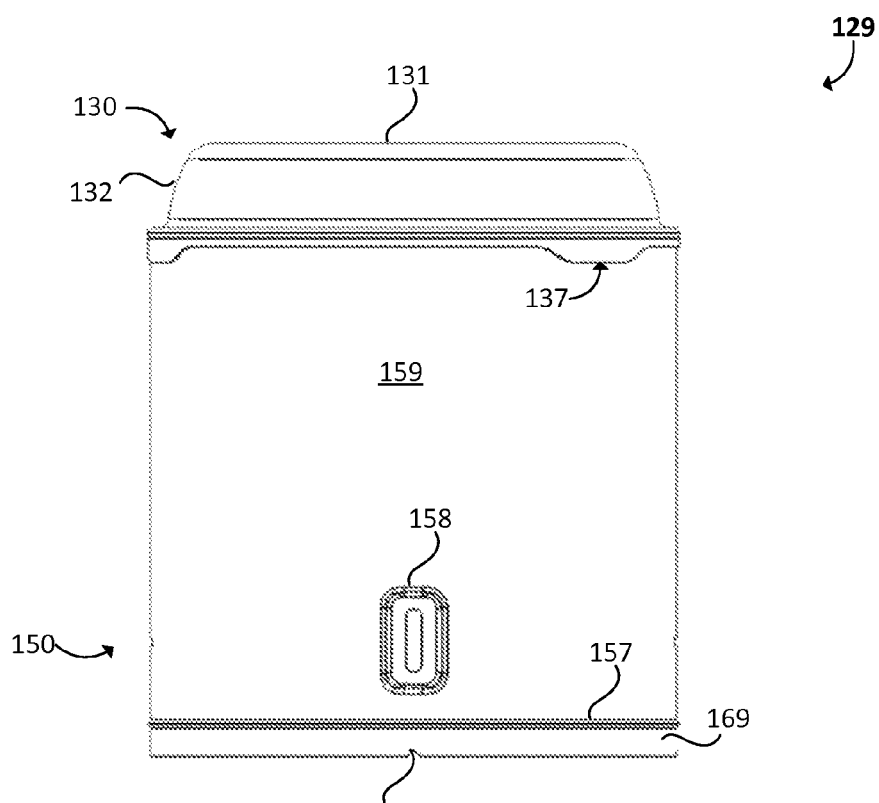
FIGS. 3A and 3B show various side views of a housing in accordance with certain example embodiments.
Figure 3B:
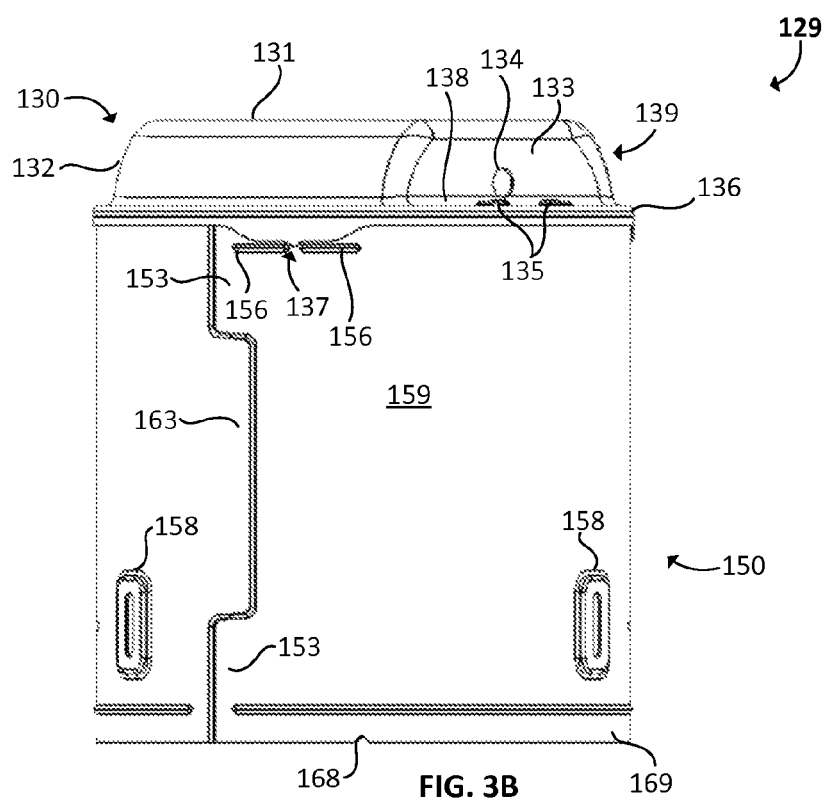

FIGS. 3A and 3B show various side views of a housing 129 that includes the housing body 150 of FIGS. 2A-2C in accordance with certain example embodiments. In one or more embodiments, one or more of the components shown in FIGS. 3A and 3B may be omitted, added, repeated, and/or substituted. Accordingly, embodiments of a housing should not be considered limited to the specific arrangements of components shown in FIGS. 3A and 3B.

Referring to FIGS. 1-3B, the housing top 130 can be mechanically coupled to the housing body 150 at the top end 166 of the housing body 150, which can create an air-tight seal therebetween. The housing top 130 can include a top portion 131, a side portion 136, and an intermediate portion 132 positioned between the top portion 131 and the side portion 136. In certain example embodiments, as least part of the intermediate portion 132 includes an interface portion 139 that includes a side wall 133 and a bottom wall 138. The side wall 133 can have an aperture 134 traversing therethrough. The bottom wall 138 can include one or more coupling features 135 disposed thereon. In such a case, the bottom wall 138 and the side wall 133 of the interface portion 139 can interrupt at least a portion of the top portion 131 and/or the intermediate portion 132.

The aperture 134 in the side wall 133 of the interface portion 139 can have a shape and size suitable for receiving one or more of a number of electrical wires, as well as the flexible conduit 102 into which the electrical wires can be disposed. The aperture 134 can also have a shape and size suitable to receive a portion of a flex connector (e.g., flex connector 710, flex connector 810), as described below with respect to FIGS. 7A-9B.

In this case, the coupling features 135 (also called flex connector coupling features 135) disposed on the bottom wall 138 of the interface portion 139 can be configured to mechanically couple to a flex connector, which can create an air-tight seal therebetween. Such coupling features 135 can be tabs enclosed on two sides, tabs enclosed on three sides, one or more notches, one or more apertures, or any other suitable features for receiving corresponding coupling features of a flex connector. The shape and size of the size portion 136 can be substantially the same as, or slightly larger than, the shape and size of the top end 166 of the hosing body 150.

In certain example embodiments, the side portion 136 can include one or more coupling features 137 (also called housing body coupling features 137) for mechanically coupling the housing top 130 to the housing body 150, which can create an air-tight seal therebetween. Specifically, the coupling features 137 can mechanically couple to the coupling features 156 of the housing body 150. The coupling features 137 can include, but are not limited to, a detent, a protrusion, a clip, and a recess. In this example, the coupling features 137 can be protrusions that slide over the protrusions formed by the coupling features 156. Alternatively, the coupling features 137 can be recesses that receive the protrusion formed by the coupling features 156.

When the coupling features 137 of the housing top 130 mechanically couple to the coupling features 156 of the housing body 150, an air-tight seal can be formed between the housing top 130 and the housing body 150. In addition to meeting ASTM E283-04 and/or an equivalent thereof, the air-tight seal formed between the housing top 130 and the housing body 150 can prevent or restrict one or more elements (e.g., moisture, dust) from outside the housing 129 from entering the cavity 198 of the housing 129. In certain example embodiments, one or more additional components (e.g., a sealing member, such as an o-ring or a gasket) can be positioned between the top end 166 of the housing body 150 and one or more portions (e.g., the side portion 136) of the housing top 130. In addition, or in the alternative, some form of sealant (e.g., caulk) can be applied to the junction between the housing top 130 and the housing body 150 by a user to form the seal between the housing top 130 and the housing body 150.

FIGS. 4A and 4B show various views of another housing top 430 in accordance with certain example embodiments. Specifically, FIG. 4A shows a top perspective view of the housing top 430, and FIG. 4B shows a cross sectional side view of the a portion of the housing top 430 that includes the coupling features 455. The housing top 430 in this case is substantially the same as the housing top 130 of FIGS. 3A and 3B, except as described below. Specifically, the coupling features 455 are disposed on the top portion 431 rather than on the wall 159 of the housing body 150, as shown in FIGS. 2A-2C.

The coupling features 455 can be the same as, or different than, the coupling features 155 of FIGS. 2A-2C. In any case, the coupling features 455, like the coupling features 155 of FIGS. 2A-2C, are configured to mechanically couple to a thermal protector case, which can create an air-tight seal therebetween. The coupling features 455 of FIGS. 4A and 4B can be recessed tabs enclosed on two sides, recessed tabs enclosed on three sides, one or more notches, one or more apertures, or any other suitable features for receiving corresponding coupling features of a thermal protector case.

Further, the coupling features 137 of the housing top 130 shown in FIGS. 3A and 3B above are not part of the side portion 436 of the housing top 430 of FIGS. 4A and 4B. Instead, the equivalent of the coupling features 137 can be disposed on the inner surface of the side portion 436, hidden from view in FIGS. 4A and 4B. Alternatively, the side portion 436 of the housing top 430 can be without any coupling features.

The coupling features 435 and/or the coupling feature 455 can be disposed in one or more other locations on the housing top 430. In addition, or in the alternative, coupling features 435 and/or the coupling feature 455 can be disposed on one or more other components of the luminaire, including but not limited to a socket assembly, a floating connector to a light engine (e.g., light-emitting diode driver), and a light engine. Thus, the flex connector 102 can be mechanically coupled to the housing 429 (e.g., the housing top 430), a socket assembly, a floating connector to a light engine (e.g., light-emitting diode driver), a light engine, and/or some other component of the luminaire.

As generally described above with respect to coupling features described herein, the coupling features 435 and/or the coupling feature 455 can be disposed on the housing top 430 can be part of a single piece with the housing top 430 (as from a mold or stamping the coupling features from the housing top 430), housing body 450, and/or other component of the luminaire. Alternatively, the coupling features 435 and/or the coupling feature 455 can be separate pieces that are mechanically coupled to the housing top 430, housing body 450, and/or other component of the luminaire using one or more of a number of methods, including but not limited to welding, epoxy, fastening devices, and compression fittings. The coupling features can be recessed (as with the coupling features 455 shown in FIGS. 4A and 4B) or protruding (as with the coupling features 435) relative to a surface of a component (e.g., the housing top 430, the housing body 450).

FIGS. 5A and 5B show various views of a thermal protector case 580 coupled to a portion of the housing top 430 of FIGS. 4A and 4B in accordance with certain example embodiments. Specifically, FIG. 5A shows a bottom perspective view of the thermal protector case 580 and the housing top 430, and FIG. 4B shows a cross sectional side view of the a portion of the housing top 430 that includes the coupling features 455. In one or more embodiments, one or more of the components shown in FIGS. 5A and 5B may be omitted, added, repeated, and/or substituted. Accordingly, embodiments of a housing top and thermal protector case should not be considered limited to the specific arrangements of components shown in FIGS. 5A and 5B.

Referring to FIGS. 1-5B, the thermal protector case 580 can be used to encase a thermally-sensitive device. Examples of such a thermally-sensitive device can include, but are not limited to, a sensor and a thermocouple. In certain example embodiments, the thermal protector case 580 can include one or more coupling features 586 (also called housing top coupling features 586 or, if the coupling features 455 are disposed on the housing body, as in FIGS. 2A-2C, the housing body coupling features) the that mechanically couple to corresponding coupling features (e.g., coupling features 455) of another component (e.g., the housing top 430) of the luminaire. When this occurs, the thermal protector case 580 can be mechanically coupled to that component of the luminaire, which can create an air-tight seal therebetween. In this example, the coupling features 586 of the thermal protector case 580 can be tabs that each can mechanically couple to the coupling features 455 of the housing top 430. In the example shown in FIGS. 5A and 5B, each of the coupling features 586 of the thermal protector case 580 is disposed within each of the coupling features 455 of the housing top 430.

In certain example embodiments, the thermal protector case 580 can also include a body 582 and one or more sides (e.g., side 584, side 585, side 588) that extend from an outer portion of the body 582. One or more of the coupling features 586 of the thermal protector case 580 can be coupled to a side of the thermal protector case 580. For example, a coupling feature 586 can be disposed on an outer edge of side 584, and another coupling feature 586 can be disposed on an outer edge of side 585. A side (e.g., side 584, side 585, side 588) of the thermal protector case 580 can be disposed at an angle (e.g., 90°) relative to the body 582. Similarly, a coupling feature 586 can be disposed at an angle (e.g., 90°) relative to the corresponding side.

To allow the coupling features 586 of the thermal protector case 580 to be disposed within each of the corresponding coupling features 455 of the housing top 430, one or more portions of the thermal protector case 580 can be flexible and/or movable (e.g., extendable, slidable). For example, one or more of the coupling features 586 can be retractable. As another example, the body 582 and/or sides (e.g., side 584, side 585) of the thermal protector case 580 can be flexible. When viewing the housing top 430 from the outside when the thermal protector case 580 is mechanically coupled to the housing top 430, at least part of the coupling features 586 of the thermal protector case 580 can be seen through the coupling features 455 in the housing top 430.

In certain example embodiments, when the thermal protector case 580 is mechanically coupled to the housing top 430, some or all of the thermal protector case 580 creates an air-tight (or nearly air-tight) seal with the housing top 430. As a result, there may be no sealing device (e.g., gasket, silicone) needed to prevent or restrict dust, moisture, and other contaminants from entering the housing 429. In addition to meeting ASTM E283-04 and/or an equivalent thereof, a sealing member, a user-applied sealant, and/or some other device can be used to create the air-tight seal between the thermal protector case 580 and the housing top 430. The air-tight seal created between the thermal protector case 580 and the housing top 430 can prevent or restrict air from within the housing 429 from escaping.

Figure 6:
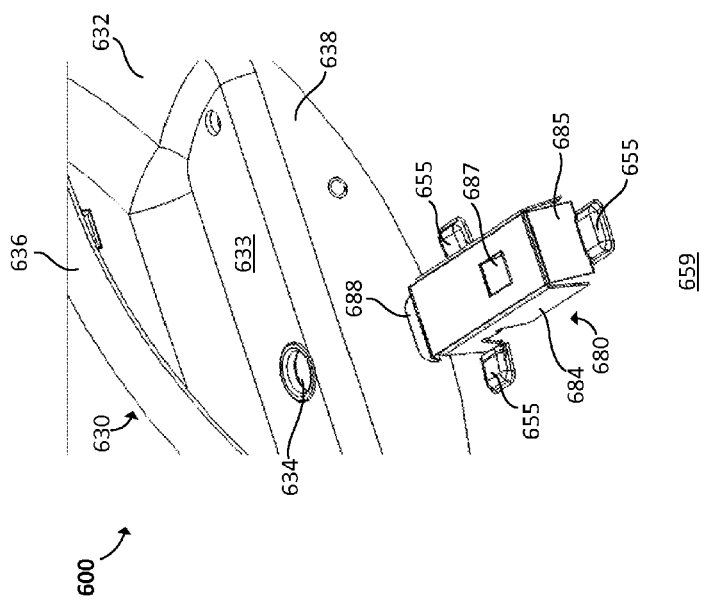
FIG. 6 shows a perspective view of a thermal protector case coupled to another portion of a housing in accordance with certain example embodiments.

FIG. 6 shows a perspective view of a thermal protector case 680 coupled to the housing body 650 in accordance with certain example embodiments. In this example, as shown in FIG. 6, the coupling features 655 that complement the coupling features 686 of the thermal protector case 680 are disposed on the wall 659 of the housing body 650 (as opposed to, or in addition to, the thermal top). As a result, the thermal protector case 680 is disposed inside the housing 629 when the coupling features 686 of the thermal protector case 680 are mechanically coupled to the coupling features 655, which can create an air-tight seal therebetween. In the orientation shown in FIG. 6, the wall 688 of the thermal protector case 680 has a curved distal portion that abuts against the bottom wall 638 of the housing top 630.

Figure 7A:
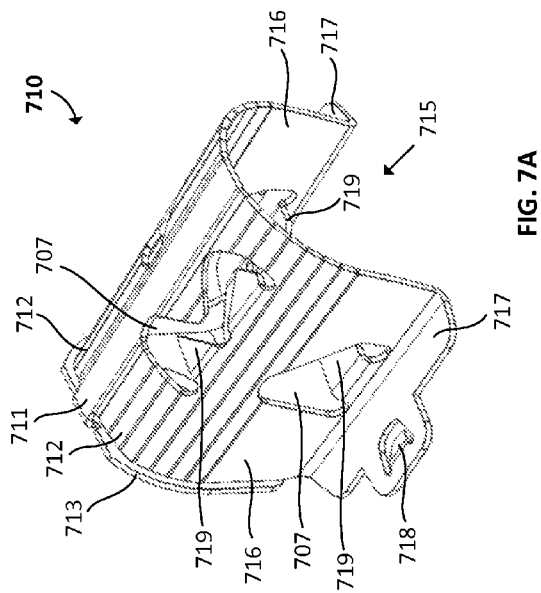
Figure 7B:
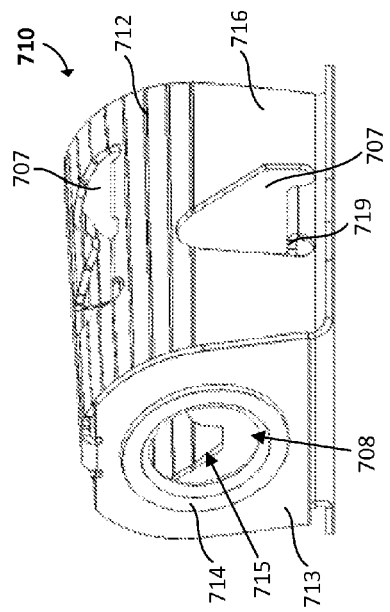

FIGS. 7A-7C show various views of a flex connector 710 in accordance with certain example embodiments. Specifically, FIG. 7A shows a top perspective view of the flex connector 710. FIG. 7B shows a side perspective view of the flex connector 710. FIG. 7C shows a top view of the flex connector 710 in a flat form. In one or more embodiments, one or more of the components shown in FIGS. 7A-7C may be omitted, added, repeated, and/or substituted. Accordingly, embodiments of a flex connector should not be considered limited to the specific arrangements of components shown in FIGS. 7A-7C.

Referring to FIGS. 1-7C, in certain example embodiments, the flex connector 710 can include one or more coupling features 718 (also called housing top coupling features 718) that allow the flex connector 710 to mechanically couple to the coupling features (e.g., coupling features 435) of a housing top (e.g., housing top 430). In this example, coupling features 718 of the flex connector 710 are tabs that can be disposed within the coupling features of a housing top. The coupling features 718 can be disposed on each side of the body 712 of the flex connector 710. A coupling feature 718 can include one or more elements (e.g., a downward protruding element (as shown in FIGS. 7A-7C), an upward protruding element) to help secure the coupling feature 718 to a complementary coupling feature (e.g., coupling feature 455).

Each coupling feature 718 can be disposed on (e.g., mechanically coupled to, a portion of) a bottom 717 of the flex connector 710. In this case, each coupling feature 718 is an extension of the bottom 717 and are disposed on a distal end of the bottom 717. Each bottom 717 can be adjacent to a side 716 of the flex connector 710, and each side 716 can be adjacent to a top 712 of the flex connector 710. In some cases, as shown in FIGS. 7A-7C, an apex 711 of the flex connector 710 can be disposed between adjacent tops 712.

To allow the coupling features 718 of the flex connector 710 to be disposed within each of the complementary coupling features (e.g., coupling feature 455 of the housing top 430), one or more portions of the flex connector 710 can be flexible and/or movable (e.g., extendable, slidable). For example, one or more of the coupling features 718 can be retractable. As another example, the flex connector 710 can be flexible, so that the sides 716 and/or the tops 712 of the flex connector 710 can be pinched inward momentarily by a user.

In certain example embodiments, the flex connector 710 can have one or more of a number of coupling features 719 (also called flex connector coupling features 719) disposed in the sides 716 and/or the tops 712 of the flex connector 710. In this example, the coupling features 719 are tabs. The coupling features 719 can be used to secure at least part of a component (e.g., flexible conduit 102) of the luminaire. Such coupling features 719 can be fixed or adjustable, and can extend inward or in some other suitable direction relative to the sides 716 and/or the tops 712 of the flex connector 710. In this example, the coupling features 719 are stamped out of the sides 716 and/or the tops 712 of the flex connector 710, leaving apertures 707 that traverse therethrough. In such a case, the coupling features 719 can be bent into position so that each coupling feature 719 is pointed inward toward the cavity 715 formed by the sides 716 and the tops 712 of the flex connector 710. A coupling features 719 can have different shapes and/or or sizes relative to the shapes and sizes of the other coupling features 719 of the flex connector 710.

In certain example embodiments, the flex connector 710 includes an aperture 708, through which one or more components (e.g., wires, cables) of the luminaire can extend. The aperture 708 can be bounded by a collar 714 disposed on an end 713 of the flex connector 710. The end 713 of the flex connector 710 can be set at an angle relative to the bottom 717 of the flex connector 710 so as to be substantially the same as the angle between the bottom wall (e.g., bottom wall 138) and the side wall (e.g., side wall 133) of the interface portion (e.g., interface portion 139) of the housing top (e.g., housing top 130). In other words, the angle between the end 713 and the bottom 717 of the flex connector 710 allows the end 713 to abut substantially flush against the side wall of the interface portion of the housing top, and also allows the bottom 717 to abut substantially flush against the bottom wall of the interface portion of the housing top.

The collar 714 can have a size, shape, and other dimensions (e.g., thickness, width) that allow the collar 714 of the flex connector 710 to fit within the aperture (e.g., aperture 634) in a housing top (e.g., housing top 630). When the collar 714 is disposed within the aperture in the housing top, an air-tight seal can be formed therebetween. The collar 714 can have a rolled (smooth) edge to reduce the possibility of a wire or cable of getting cut or pinched. A seal can be formed between the collar 714 of the flex connector 710 and the housing top 630.

As FIG. 7C shows, the flex connector 710 can be created by cutting, pressing, stamping, bending, and/or otherwise manipulating a continuous sheet of some material (e.g., metal, plastic, rubber). Some apertures (e.g., aperture 708, apertures 707) of the flex connector 710 can be stamped out of the sheet. Multiple flex connectors 710 can be created from a single sheet.

FIGS. 8A and 8B show various views of another flex connector 810 in accordance with certain example embodiments. Specifically, FIG. 8A shows a top perspective view of the flex connector 810. FIG. 8B shows a bottom perspective view of the flex connector 810. The flex connector 810 of FIGS. 8A and 8B is substantially the same as the flex connector 710 of FIGS. 7A-7C, except that the shape and orientation of the coupling features 818 of the flex connector 810 are different than the shape and orientation of the coupling features 718 of the flex connector 710.

Similarly, FIGS. 9A and 9B show various views of yet another flex connector 910 in accordance with certain example embodiments. Specifically, FIG. 9A shows a top perspective view of the flex connector 910. FIG. 9B shows a bottom view of the flex connector 910. The flex connector 910 of FIGS. 9A and 9B is substantially the same as the flex connector 710 of FIGS. 7A-7C and the flex connector 810 of FIGS. 8A and 8B, except as described below.

The flex connector 910 does not have an apex. In other words, there is one continuous top 912 that covers the middle portion of the flex connector 910. Further, the apertures 907 in the top 912 and sides 916 of the flex connector of FIGS. 9A and 9B are shaped in substantial rectangles, as opposed to the corresponding apertures of the flex connector 710 and the flex connector 810, which are irregularly shaped. In addition, the flex connector 910 includes one or more coupling features 991 (also called flex connector coupling features 991) disposed on the outer edge of the end 913 of the flex connector 910. Each coupling feature 991 can be movable relative to the end 913. In this example, each coupling feature 991 can be positioned over a complementary coupling feature (hidden from view by the coupling feature 991) (e.g., a protrusion, a slot) disposed in one or both sides 916 so that the coupling feature 991 can be mechanically coupled to a side 916. Alternatively, the coupling feature 991 can be disposed on a side 916 and movable relative to the side 916. In such a case, the coupling feature 991 can be positioned over a complementary coupling feature disposed on the end 913.

Figure 10D:
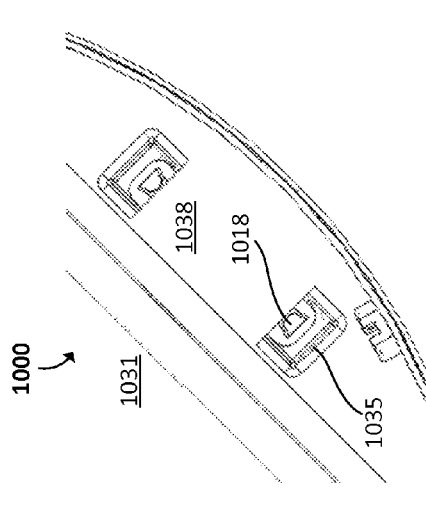
Figure 10F:
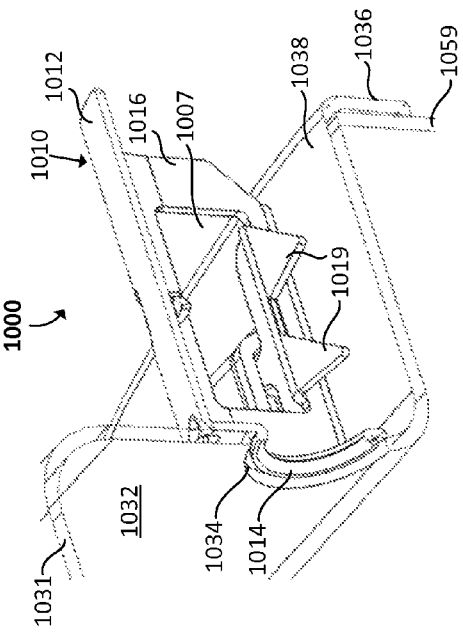
Figure 10C:
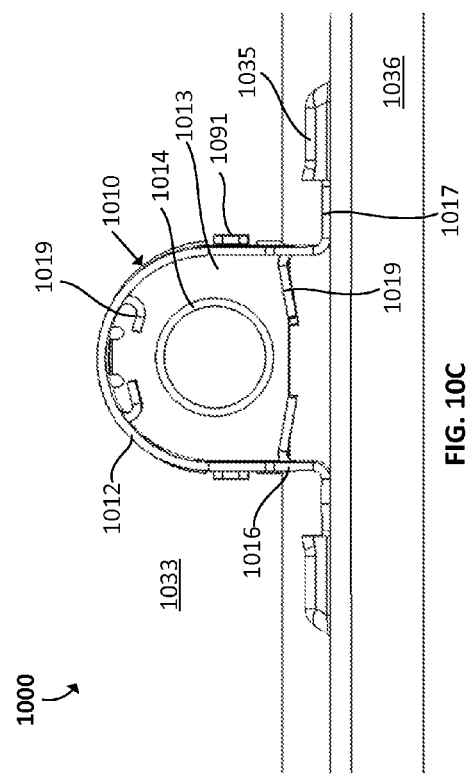
Figure 10E:
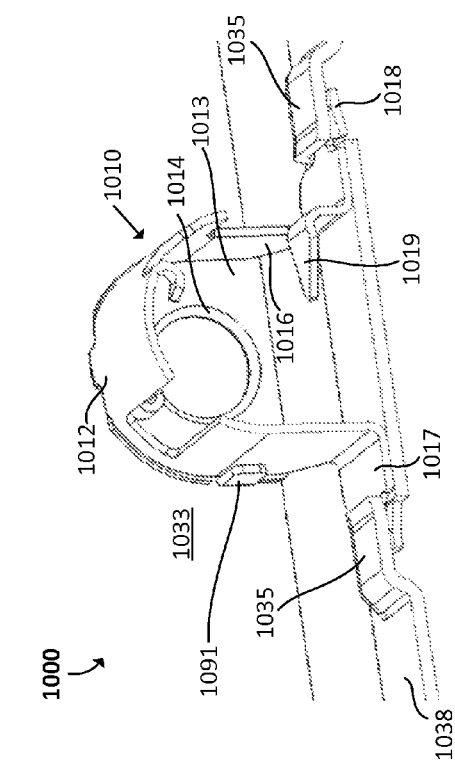

FIGS. 10A-10F show various views of a subsystem 1000 of the luminaire that includes a flex connector 1010 coupled to a housing top 1030 in accordance with certain example embodiments. FIG. 10A shows a top perspective view of the subsystem 1000. FIG. 10B shows a top view of the subsystem 1000. FIG. 10C shows a rear view of the subsystem 1000. FIG. 10D shows a bottom view of the subsystem 1000. FIGS. 10E and 10F each show a cross-sectional perspective view of the subsystem 1000. In one or more embodiments, one or more of the components shown in FIGS. 10A-10F may be omitted, added, repeated, and/or substituted. Accordingly, embodiments of a flex connector coupled to a housing top should not be considered limited to the specific arrangements of components shown in FIGS. 10A-10F.

Referring to FIGS. 1-10F, when viewing the housing top 1030 from the inside when the flex connector 1010 is mechanically coupled to the housing top 1030, at least part of the coupling features 1018 of the flex connector 1010 can be seen through the apertures in the housing top 1030 created by the coupling features 1035 of the bottom wall 1038. The collar 1014 of the flex connector 1010 can be disposed within the aperture 1034 that traverses the side wall 1033 of the interface portion 1039 of the housing top 1030. In such a case, the collar 1014 of the flex connector 1010 can be mechanically coupled to the side wall 1033 of the interface portion 1039 of the housing top 1030.

In certain example embodiments, when the collar 1014 of the flex connector 1010 is mechanically coupled to the side wall 1033 of the interface portion 1039 of the housing top 1030, some or all of the collar 1014 and/or the end 1013 of the flex connector 1010 creates an air-tight (or nearly air-tight) seal with the housing top 1030. As a result, there may be no sealing member (e.g., gasket, silicone, o-ring) needed to meet the requirements under ASTM E283-04 (and/or an equivalent thereof), and/or to prevent or restrict dust, moisture, and/or other contaminants from entering the housing 1029 where the flex connector 1010 is mechanically coupled to the housing top 1030. In addition, or in the alternative, the air-tight seal created between the flex connector 1010 and the housing top 1030 can prevent or restrict air from within the housing 1029 from escaping. The air-tight seal can be formed where the collar 1013 couples to the side wall 1033 of the interface portion 1039 of the housing top 1030 and/or where the coupling features 1018 of the flex connector 1010 couple to the coupling features 1035 of the housing top 1030.

The position and/or orientation of the coupling features 1018 of the flex connector 1010, the coupling features 1035 of the housing top 1030, the collar 1013 of the flex connector 1010, and the aperture 1034 in the side wall 1033 of the housing top 1030 can be such that the end 1013 of the flex connector 1010 abuts against the side wall 1033 and the bottom 1017 of the flex connector 1010 abuts against the bottom wall 1038 of the housing top 1030 when the coupling features 1035 are engaged with the coupling features 1018 and when the collar 1014 is engaged with the side wall 1033 at the aperture 1034.

Figure 11B:
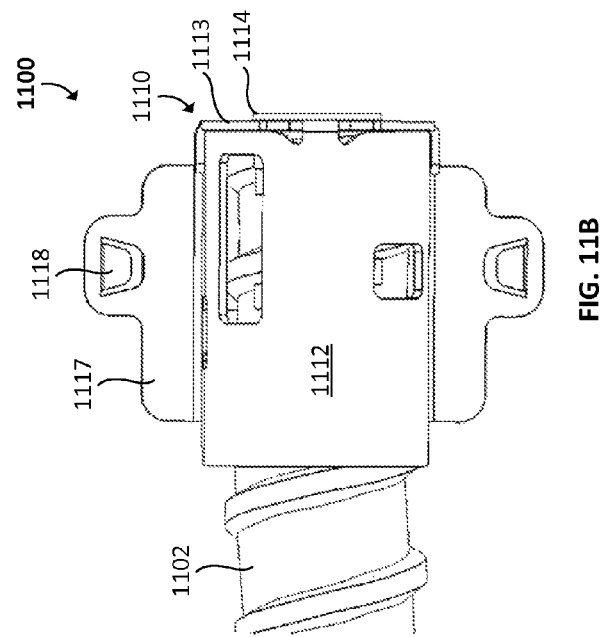
FIGS. 11A-11C show various views of a flex connector coupled to a conduit in accordance with certain example embodiments.
Figure 11A:
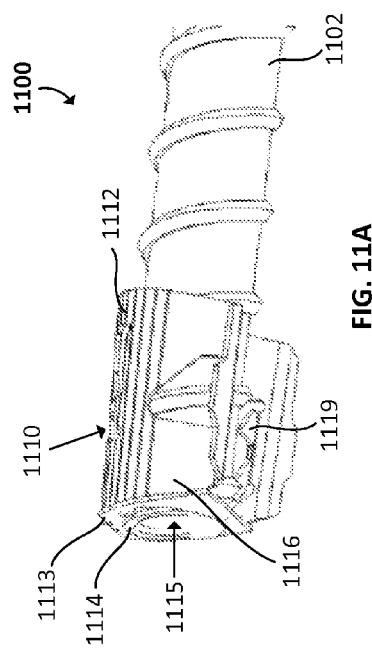
Figure 11C:
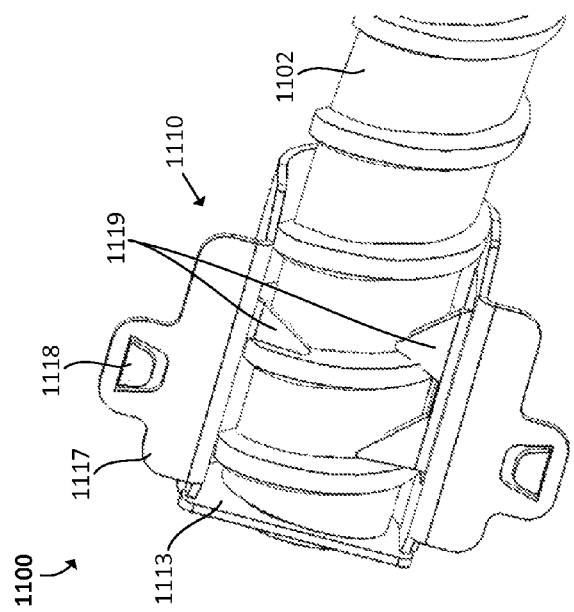

FIGS. 11A-11C show various views of a subsystem 1100 that includes a flex connector 1110 coupled to a flexible conduit 1102 in accordance with certain example embodiments. FIG. 11A shows a perspective view of the subsystem 1100. FIG. 11B shows a top view of the subsystem 1100. FIG. 11C shows a bottom perspective view of the subsystem 1100. In one or more embodiments, one or more of the components shown in FIGS. 11A-11C may be omitted, added, repeated, and/or substituted. Accordingly, embodiments of a flex connector coupled to a flexible conduit should not be considered limited to the specific arrangements of components shown in FIGS. 11A-11C.

Referring to FIGS. 1-11C, the various coupling features 1119 of the flex connector 1110 can be positioned (e.g., bent) in such a way in the cavity 1115 of the flex connector 1110 so as to secure the flexible conduit 1102. For example, the coupling features 1119 disposed in the sides 1116 of the flex connector 1110 can be bent inward to abut against the bottom portion of the flexible conduit 1102, while the coupling features 1119 disposed in the tops 1112 of the flex connector 1110 can be bent inward to abut against the top portion of the flexible conduit 1102. Further, the distal end of the flexible conduit 1102 can abut against the inner surface of the end 1113 of the flex connector 1110.

The coupling features 1119 can be moved into position after the flexible conduit 1102 is disposed within the cavity 1115 of the flex connector 1110. In such a case, flex connector 1110 can be used to house any of a number of sizes of flexible conduits 1102. The coupling features 1119 can be spaced in such a way as to allow the flexible conduit 1102 to fit between the coupling features 1119 within the cavity 1115. In addition, or in the alternative, one or more of the coupling features 1119 can be positioned within the cavity 1115 in such a way as to substantially match the pitch of the flexible conduit 1102. In such a case, the coupling features 1119 can act as threads so that the flexible conduit 1102 can be rotated further into or out of the cavity 1115 of the flex connector 1110 using the coupling features 1119.

FIGS. 12A-12C show various perspective views of a subsystem 1200 that includes a housing body 1250 coupled to a frame 1205 in accordance with certain example embodiments. Specifically, FIG. 12A shows a coupling feature 1206 of the frame 1205 that is initially engaged with the coupling feature 1258 of the housing body 1250 by a fastening device 1292 (e.g., a screw). FIGS. 12B and 12C shows the coupling feature 1206 of the frame 1205 fully engaged with the coupling feature 1258 of the housing body 1250 by the fastening device 1292. In one or more embodiments, one or more of the components shown in FIGS. 12A-12C may be omitted, added, repeated, and/or substituted. Accordingly, embodiments of a housing body coupled to a frame should not be considered limited to the specific arrangements of components shown in FIGS. 12A-12C.

Referring to FIGS. 1-12C, the fastening device 1292 can be directed from within the cavity 1298 of the housing body 1250, through an aperture in the wall 1259 of the housing body 1250, and through an aperture in the coupling feature 1206 (also called a housing coupling feature) of the frame 1205. As the fastening device 1292 is driven further outward, the coupling feature 1206 of the frame 1205 is drawn toward the coupling feature 1258 disposed on the wall 1259 of the housing body 1250. Eventually, substantially all of the coupling feature 1206 abuts against substantially all of the coupling feature 1258 disposed on the wall 1259 of the housing body 1250. The frame 1205 can have more than one coupling feature 1206.

As described above, each coupling feature 1258 disposed on the housing body 1250 can be a protrusion from the wall 1259 of the housing body 1250. As the fastening device 1292 draws the housing coupling feature 1206 of the frame 1205 toward the coupling feature 1258, the coupling feature 1258 can become deformed so that an air-tight seal can be formed between the housing coupling feature 1206 of the frame 1205 and the coupling feature 1258. In so doing, any portions of the aperture (in the case of a slot) in the coupling feature not occupied by the fastening device 1292 is covered by the housing coupling feature 1206. Further, because the coupling feature 1258 can be deformed to form an air-tight seal with the housing coupling feature 1206, the cylindrical shape of the wall 1259 and the rest of the housing body 1250 can remain substantially unchanged (little or no deformity), which allows the other coupling features disposed on the housing body 1250 to maintain an air-tight seal with the corresponding coupling features to which they couple.

In certain example embodiments, when the coupling feature 1206 of the frame 1205 is mechanically coupled to the coupling feature 1258 disposed on the wall 1259 of the housing body 1250, some or all of the coupling feature 1206 of the frame 1205 creates an air-tight (or nearly air-tight) seal with the coupling feature 1258 disposed on the wall 1259 of the housing body 1250. As a result, there may be no sealing member (e.g., gasket, silicone, o-ring) needed to prevent or restrict dust, moisture, and/or other contaminants from entering the housing 1229 where the coupling feature 1206 is mechanically coupled to the coupling feature 1258. In addition, or in the alternative, the air-tight seal created between the coupling feature 1206 and the coupling feature 1258 can prevent or restrict air from within the housing 1229 from escaping.

FIGS. 13A-13F show various views of a subsystem 1300 that includes a sealing member 1370 integrated with a frame 1305 in accordance with certain example embodiments. FIG. 13A shows a top view of the subsystem 1300. FIG. 13B shows a cross-sectional side view of the sealing member 1370. FIGS. 13C and 13D show cross-sectional side views of a portion of the subsystem 1300. FIG. 13E shows a top perspective view of the subsystem 1300 without the sealing member 1370. FIG. 13F shows a top perspective view of the subsystem 1300 with the sealing member 1370. In one or more embodiments, one or more of the components shown in FIGS. 13A-13F may be omitted, added, repeated, and/or substituted. Accordingly, embodiments of a sealing member coupled to a frame should not be considered limited to the specific arrangements of components shown in FIGS. 13A-13F.

Referring to FIGS. 1-13F, the sealing member 1370 can be a flexible material that helps keep some or all of a number of elements (e.g., dust, moisture) from entering the cavity 1398 of the housing 1329. The sealing member 1370 can be made of one or more of a number of materials, including but not limited to an elastomeric, rubber, plastic, and paper. The frame 1305 can have one or more walls that form a channel 1349 into which some or all of the sealing member 1370 can be disposed. For example, as shown in FIGS. 13A-13F, the frame 1305 can include a an outer wall 1395, a right side wall 1394, a top wall 1393, and a left side wall 1396 that is disposed over some or all of the perimeter of the frame and form a cavity 1397 therebetween. The shape and size of the cavity 1397 formed by the various walls (particularly the left side wall 1396) of the frame 1305 can be substantially the same as (or slightly larger than) the shape and size of the cavity formed by the bottom end of the housing body.

In its natural state, the sealing member 1370 can appear as shown in FIG. 13B. In this example, the sealing member 1370 can have a rounded top 1371 having an extension 1373 on each side of the top 1371, a base 1372, and one or more sides 1374. In this case, there are two sides 1374 that form, along with the top 1371 and the base 1372, a cavity 1375. The cavity 1375 can have a width, formed by the sides 1374. Each extension 1373 can extend laterally beyond the sides 1374, and the width of the base 1372 can also be larger than the width of the cavity 1375. Further, as shown in FIG. 3B, the width of the base 1372 can be larger than the width of the top 1371, including the extensions 1373.

In certain example embodiments, the boundaries of the channel 1349 in which the sealing member 1370 is disposed can change along its length. For example, as shown in FIG. 13C, the channel 1349 can be defined by the right side wall 1394, the top wall 1393, and the left side wall 1396. In such a case, the width of the channel 1349 can be less than the width of the top 1371 with the extensions 1373. As a result, the extensions 1373 are forced inward, causing the top 1371 and the sides 1374 to be compressed and deformed. This compression and deformation of the top 1371 and the sides 1374 can cause one or more seals to form between the sealing member 1370 and the right side wall 1394, the top wall 1393, and/or the left side wall 1396. In addition, with an upward force applied to the sealing member 1370 and/or a downward force applied to the frame 1305 can create a seal between the base 1372 of the sealing member 1370 and the outer wall 1395.

As another example of how the boundaries of the channel 1349 in which the sealing member 1370 is disposed can change along its length, as shown in FIG. 13D, the channel 1349 can be defined by the top wall 1393 and the left side wall 1396, without the right side wall 1394. As a result, one the left extension 1373 of the sealing member 1370 is forced inward, causing part of the top 1371 and one of the sides 1374 to be compressed and deformed. This compression and deformation of the top 1371 and the left side 1374 can create one or more seals with the right side wall 1394 and/or the top wall 1393. In addition, with an upward force applied to the sealing member 1370 and/or a downward force applied to the frame 1305 can create a seal between the base 1372 of the sealing member 1370 and the outer wall 1395.

In certain example embodiments, the sealing member 1370 can form a continuous loop. In other words, the sealing member 1370 can have not ends. Alternatively, the sealing member 1370 can be have two ends that abut against each other when the sealing member 1370 is disposed in the channel 1349 of the frame 1305. In such a case, the sealing member 1370 can be cut to a length that is substantially the same as the length of the channel 1349 of the frame 1305 in which the sealing member 1370 is disposed. FIGS. 13E and 13F show the coupling feature 1306 of the frame 1305. Here, the aperture 1327 through which a fastening device (e.g., fastening device 1292 described above with respect to FIGS. 12A-12C) can be disposed.

The frame 1305 can include one or more of a number of protruding members 1389 (e.g., tabs) that are used to secure the vertical position of the sealing member 1370 relative to the frame 1305. For example, protruding members 1389 can be disposed adjacent to and on either side of an optional aperture 1348 formed in the frame 1305 by the coupling feature 1306. In addition, or in the alternative, the protruding members 1389 can be disposed at one or more other locations along the channel 1349, as shown in FIG. 13A, regardless of whether one or more optional apertures 1348 in the frame 1305 exist. The protruding members 1389 can extend inward toward the channel 1349 to the extent that the protruding members 1389 are disposed between one of the extensions 1373 of the top 1371, the base 1372, and one of the sides 1374 of the sealing member 1370. In certain example embodiments, the protruding members 1389 abut against one or more of the extensions 1373 of the top 1371, the base 1372, and one of the sides 1374 of the sealing member 1370.

Figure 14B:
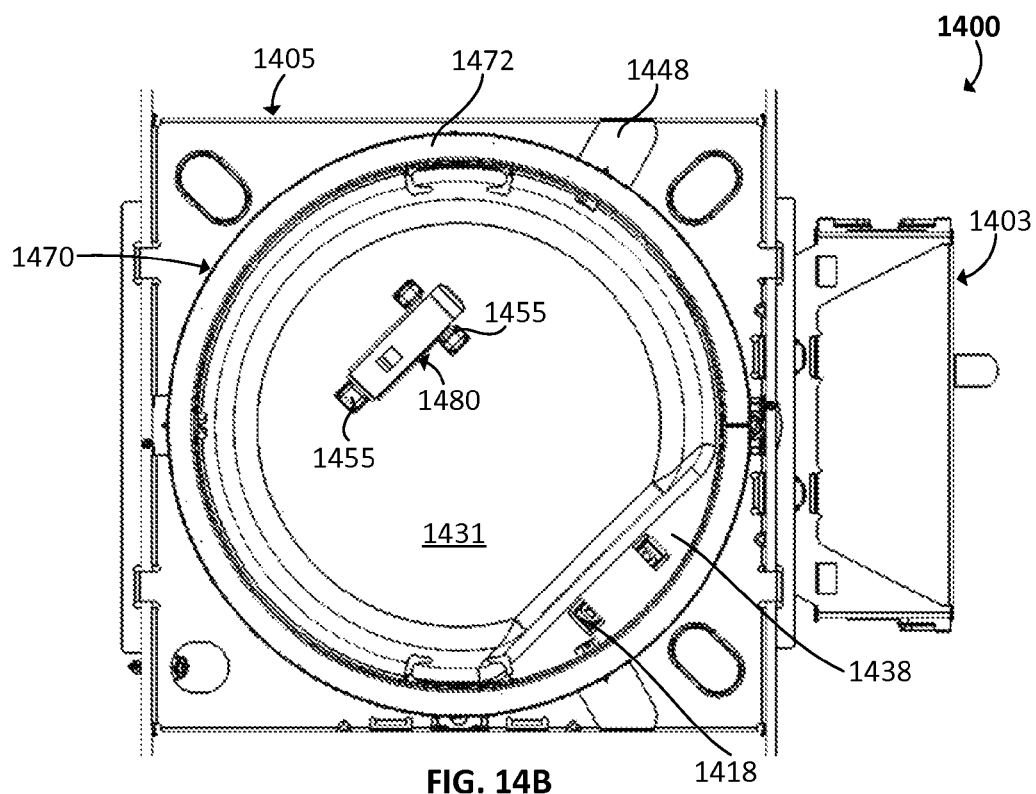
Figure 14C:
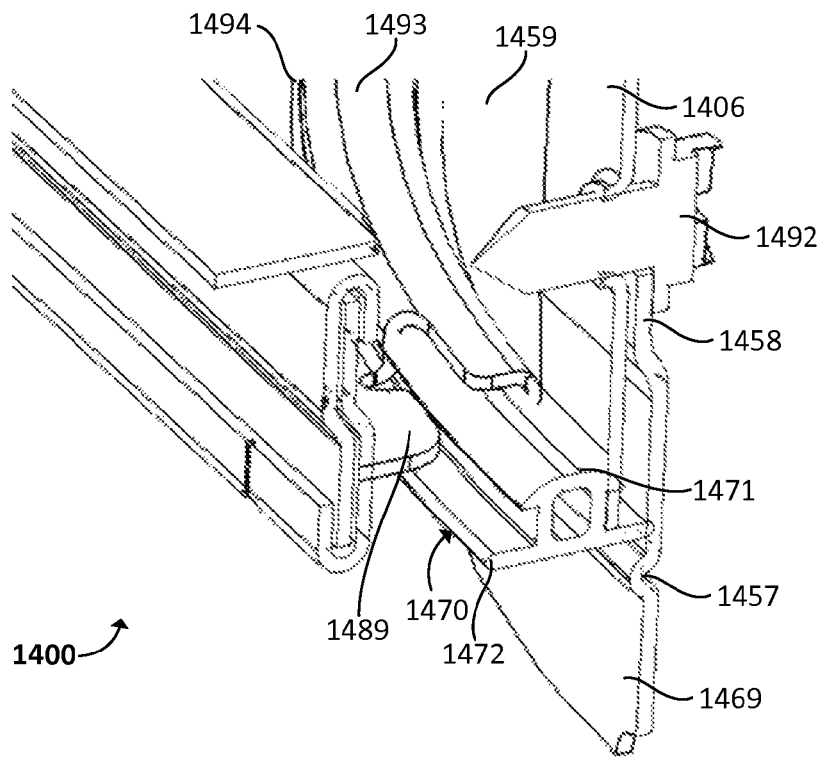

FIGS. 14A-14C show various views of a portion of a luminaire 1400 that includes a sealing member 1470 integrated with a housing 1429 and a frame 1405 in accordance with certain example embodiments. FIG. 14A shows a bottom exploded view of the portion of the luminaire 1400. FIG. 14B shows a bottom view of the portion of the luminaire 1400. FIG. 14C shows a side perspective cross-sectional view of the portion of the luminaire 1400. In one or more embodiments, one or more of the components shown in FIGS. 14A-14C may be omitted, added, repeated, and/or substituted. Accordingly, embodiments of a luminaire should not be considered limited to the specific arrangements of components shown in FIGS. 14A-14C.

The luminaire 1400 of FIGS. 14A-14C is substantially similar to the subsystem 1300 of FIGS. 13A-13F, except that the luminaire 1400 includes the housing 1429. Referring to FIGS. 1-14C, the coupling feature 1457 disposed on the housing body 1450 can be disposed below, and abut against, the base 1472 of the sealing member 1470. In such a case, the coupling feature 1457 can help (in addition to the protruding members 1489 of the frame 1405) to secure the sealing member 1470 relative to the frame 1405 and the housing 1429. In addition, the coupling feature 1457 of the housing body 1450 can apply a compressive force against the base 1472 of the sealing member 1470, forming a seal between the coupling feature 1457 and the base 1472.

FIGS. 15A and 15B shows various views of a lighting system 1599 that includes a luminaire 1501 installed in a space dividing member 1579 (e.g., a ceiling tile, drywall, wood paneling) in accordance with certain example embodiments. Specifically, FIG. 15A shows a cross-sectional side view of the lighting system 1599, and FIG. 15B shows a detailed cross sectional side view of the components adjacent to the sealing member 1570. In this case, the sealing member 1570 can reduce or prevent air flow between a space dividing member 1579 and the outside of the frame 1505 and/or housing 1529. In addition, or in the alternative, the sealing member 1570 can be used to seal a gap 1578 between the frame 1505 and the space dividing member 1579 and/or between the housing 1529 (e.g., the lower wall 1569) and the space dividing member 1579.

Figure 16A:
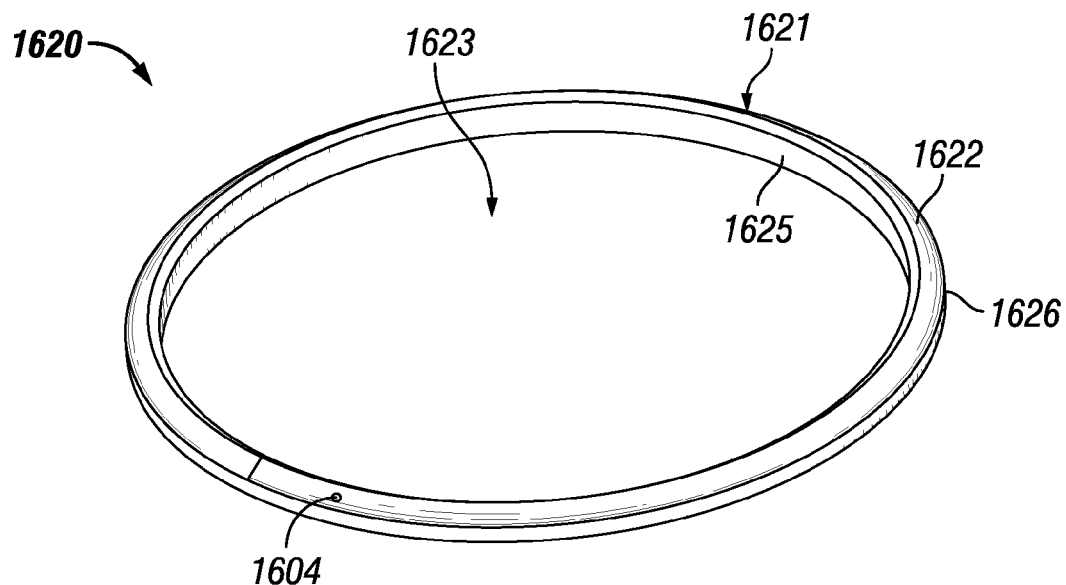
FIGS. 16A and 16B show another sealing member for a luminaire in accordance with certain example embodiments.
Figure 16B:
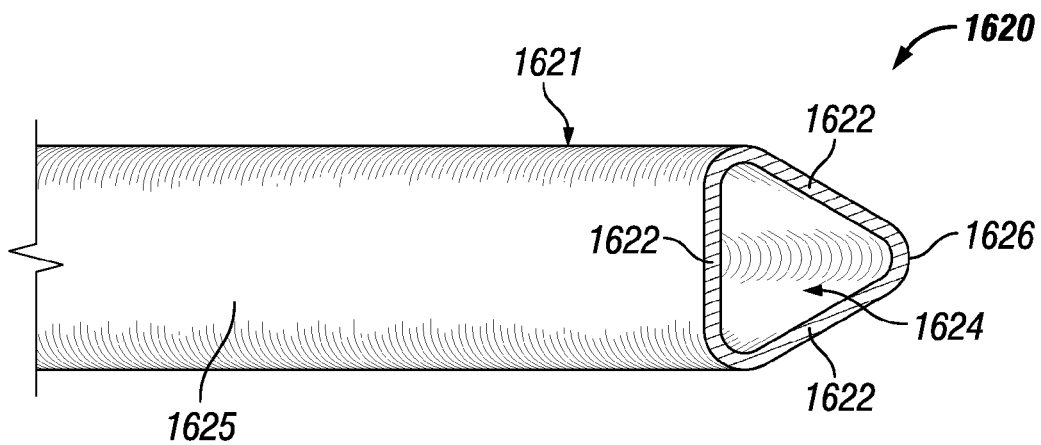

FIGS. 16A and 16B show another sealing member 1620 for a luminaire in accordance with certain example embodiments. In one or more embodiments, one or more of the components shown in FIGS. 16A and 16B may be omitted, added, repeated, and/or substituted. Accordingly, embodiments of a sealing member should not be considered limited to the specific arrangements of components shown in FIGS. 16A and 16B. The sealing member 1620 of FIGS. 16A and 16B is different from the sealing member 1470 described above with respect to FIGS. 14A-14C. Specifically, the sealing member 1620 has a different shape and is disposed in a different location on the luminaire compared to the shape and location on the luminaire of sealing member 1470. The sealing member 1620 of FIGS. 16A and 16B is in a natural state, as defined below.

Referring to FIGS. 1-16B, the sealing member 1620 of FIGS. 16A and 16B can be made of any one or more of a number of flexible and resilient (elastomeric) materials. For example, the sealing member 1620 can be made of rubber. As another example, the sealing member 1620 can be made of silicone. The example sealing member 1620 can have one or more of a number of components. For example, as shown in FIGS. 16A and 16B, the sealing member 1620 can include a body 1621 that is substantially continuous. In other words, the body 1621 of the sealing member 1620 can form a single piece that has no end.

In such a case, the body 1621, when viewed from above, can form any of a number of shapes when in a natural state (i.e., not coupled to something else, such as a wall (e.g., wall 169, wall 159) of a housing 150 of a luminaire 100), as shown in FIG. 16A. Examples of such shapes can include, but are not limited to, a circle (as shown in FIG. 16A), an oval, a square, a triangle, a rectangle, and a random shape. In addition, the body 1621 forms a cavity 1623 that is fully or substantially fully enclosed by the body 1621.

In certain example embodiments, the body 1621 has at least one wall 1622 that forms a cavity 1624 that is fully or substantially fully enclosed by the wall 1622 of the body 1621. The cavity 1624 can have any of a number of shapes when viewed cross-sectionally and when the body 1621 is in a natural state. Examples of such shapes of the cavity 1624 can include, but are not limited to, a triangle, a circle, an oval, a square, and a random shape. In this case, the body 1621 has three walls 1622 that form a closed cavity 1624 in the shape of a triangle.

The body 1621 has an inner perimeter 1625 and an outer perimeter 1626. Depending on the shape of the cavity 1624 formed by the inner perimeter 1625 of the body 1621, the inner perimeter 1625 can be called by other names, including but not limited to a diameter (in the case when the shape of the cavity 1624 is circular), and a major axis or a minor axis (in the case when the shape of the cavity 1624 is elliptical). In certain example embodiments, the inner perimeter 1625 is configured to abut against the outer surface of a housing of a luminaire. As such, shown below with respect to FIGS. 19A-20B, the size of the inner perimeter 1625 can be smaller than or equal to the size of the housing of the luminaire defined by the outer surface of the housing. This allows the sealing member 1620 to form an air-tight seal with the housing of the luminaire.

In certain example embodiments, the body 1621 of a sealing member 1620 can include one or more features that allow the shape of the cavity 1624 to change (as when the sealing member 1620 is under compression) without damaging the body 1621. For example, as shown in FIG. 16A, there can be one or more apertures 1604 that traverse one or more walls 1622 of the body 1621 of the sealing member 1620. Each aperture 1604 allows air to transfer from inside the cavity 1624 to outside the cavity 1624 as the sealing member 1620 is compressed or deformed, as explained below. In other words, the aperture 1604 reduces the compression force applied to the body 1621 and allows the shape of the cavity 1624 to change without creating a tear in the wall 1622 of the body 1621. Similarly, when the sealing member 1620 is no longer compressed or deformed, each aperture 1604 can allow air to transfer from outside the cavity 1624 to inside the cavity 1624, returning the shape of the cavity 1624 substantially to its original form.

Figure 17:
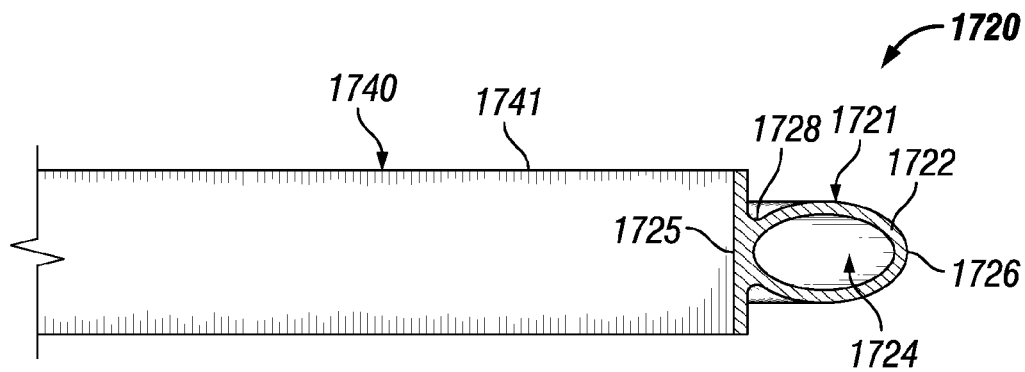
FIG. 17 shows yet another sealing member for a luminaire in accordance with certain example embodiments.
Figure 18:
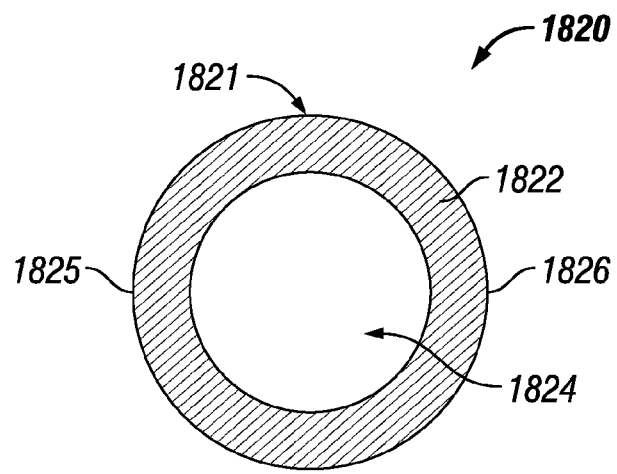
FIG. 18 shows still another sealing member for a luminaire in accordance with certain example embodiments.

FIGS. 17 and 18 show alternative sealing members for a luminaire in accordance with certain example embodiments. In one or more embodiments, one or more of the components shown in FIGS. 17 and 18 may be omitted, added, repeated, and/or substituted. Accordingly, embodiments of a sealing member should not be considered limited to the specific arrangements of components shown in FIGS. 17 and 18. Referring to FIGS. 1-18, The sealing member 1720 of FIG. 17 and the sealing member 1820 of FIG. 18 are substantially similar to the sealing member 1620 of FIGS. 16A and 16B, except as described below. Specifically, the shape of the cavity 1724 of the sealing member 1720 of FIG. 17 is an oval (e.g., an ellipse) instead of a triangle. Further, the shape of the cavity 1824 of the sealing member 1820 of FIG. 18 is a circle.

The sealing member 1720 of FIG. 17 also includes an extension 1740 that is coupled to and disposed at the inner perimeter of the wall 1722 of the body 1721. The extension 1740 can have any of a number of shapes, sizes, features, and/or other configurations. In this case, the extension 1740 is a planar wall 1741 that is disposed at the inner end of the major axis formed by the wall 1722 of the body 1721. As a result, the wall 1741 of the extension 1740 becomes the inner perimeter 1725 of the sealing member 1720, which means that the wall 1741 of the extension 1740 is configured to abut against the outer surface of a housing of a luminaire. This allows the sealing member 1720 to form an air-tight seal with the housing of the luminaire.

The extension 1740 adjoins the body 1721 at a junction 1728. The junction 1728 is designed to keep the extension 1740 and the body 1721 coupled to each other without letting air and/or other particles (e.g., dust, moisture) traverse therebetween, regardless of whether the sealing member 1720 or any portions thereof is in a normal state or in a compressed (deformed) state.

Figure 19A:
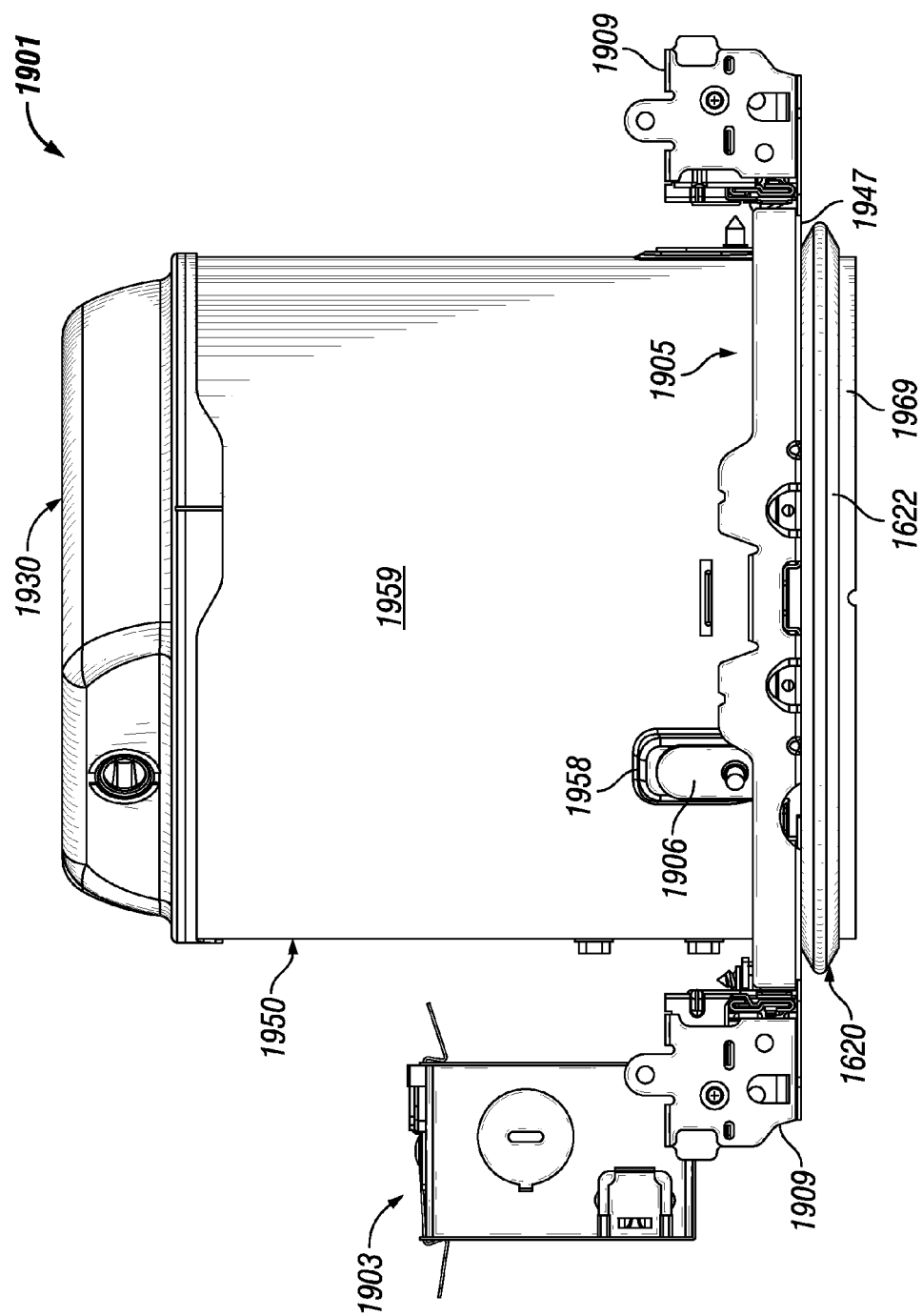
Figure 19B:
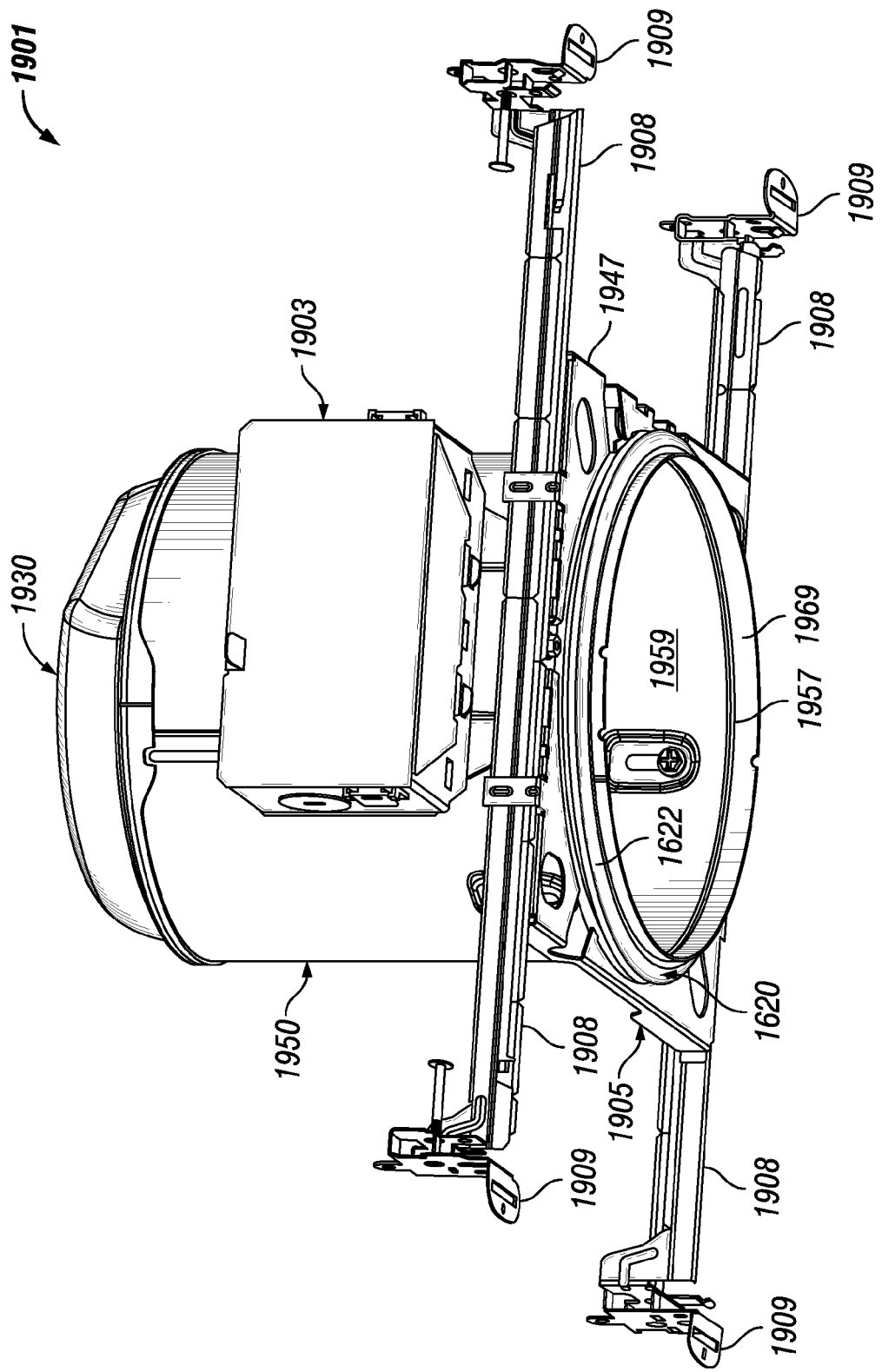
Figure 19D:
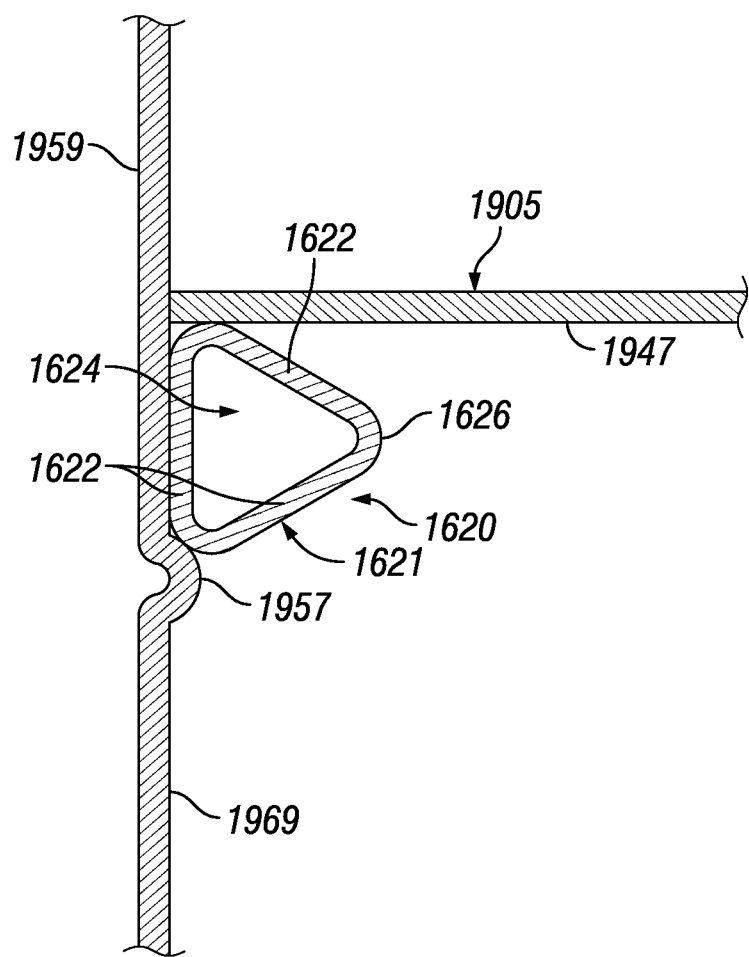

FIGS. 19A-19D show a luminaire 1901 that includes the sealing member 1620 of FIGS. 16A and 16B in accordance with certain example embodiments. Specifically, FIG. 19A shows a side view of the luminaire 1901. FIG. 19B shows a side-bottom perspective view of the luminaire 1901. FIG. 19C shows a cross-sectional side view of the luminaire 1901. FIG. 19D shows a cross-sectional side view of a detail of the luminaire 1901. In one or more embodiments, one or more of the components shown in FIGS. 19A-19D may be omitted, added, repeated, and/or substituted. Accordingly, embodiments of a luminaire should not be considered limited to the specific arrangements of components shown in FIGS. 19A-19D. Referring to FIGS. 1-19D, the luminaire 1901 and its various components (e.g., housing body 1950, housing top 1930, junction box 1903, frame 1905, hangar bar 1908, hangar bar fastener 1909) are substantially similar to the luminaire and its various components discussed above with respect to FIGS. 1-15B, except that the sealing member 1370 described in FIGS. 1-15B is replaced by the sealing member 1620 of FIGS. 16A and 16B.

In certain example embodiments, the sealing member 1620 of FIGS. 19A-19D is disposed in a different location relative to the housing body 1950 compared to where the sealing member 1370 is disposed. For example, as shown in FIG. 19C, the sealing member 1620 can be disposed over coupling feature 1957. In such a case, part of the inner perimeter 1625 (in this instance, the wall 1622 of the body 1621 that forms the inner perimeter 1625) abuts against the coupling feature 1957. If the height of the wall 1622 of the body 1621 that forms the inner perimeter 1625 is greater than the height of the outer surface of the coupling feature 1957, then the wall 1622 of the body 1621 that forms the inner perimeter 1625 can also abut against at least a portion of the outer surface of the lower wall 1969 (adjacent to the coupling feature 1957) of the housing body 1950 and/or at least a portion of the outer surface of the wall 1959 (adjacent to the coupling feature 1957) of the housing body 1950.

As another example, as shown in FIG. 19D, the sealing member 1620 can be disposed just above coupling feature 1957 between coupling feature 1957 and the bottom surface 1947 of the frame 1905. In this case, the top of the coupling feature 1957 can abut against an outer edge of the body 1621 to hold the sealing member 1620 in position and prevent the sealing member 1620 from sliding down the lower wall 1969 of the housing body 1950.

Because the sealing member 1620 (or at least the body 1621 of the sealing member 1620) is made of a flexible (e.g., elastomeric) material, and because the inner perimeter 1625 of the sealing member 1620 is less than the outer perimeter of the lower wall 1969 of the housing body 1950 (which, in turn, is less than the outer perimeter of the coupling feature 1957 of the housing body 1950), the body 1621 of the sealing member 1620 becomes deformed when the sealing member 1620 is disposed over the coupling feature 1957 of the housing body 1950. In such a case, the sealing member 1620 forms an air-tight seal between itself and the housing body 1950.

In addition, when the sealing member 1620 is disposed over the coupling feature 1957 of the housing body 1950, the cavity 1624 formed by the wall 1622 of the body 1621 of the sealing member 1620 can become deformed into a different shape. For example, as shown in FIG. 19C, the "base" of the triangular cavity 1624 is no longer linear where the wall 1622 that forms the inner perimeter of the sealing member 1620 protrudes inward to the cavity 1624 as a result of the protrusion formed by the coupling feature 1957. Put another way, the sealing member 1620 is shown in FIGS. 19A-19D as being in a deformed state because it is stretched and deforms the cavity 1624 in order to be disposed over the housing body 1950.

Figure 20A:
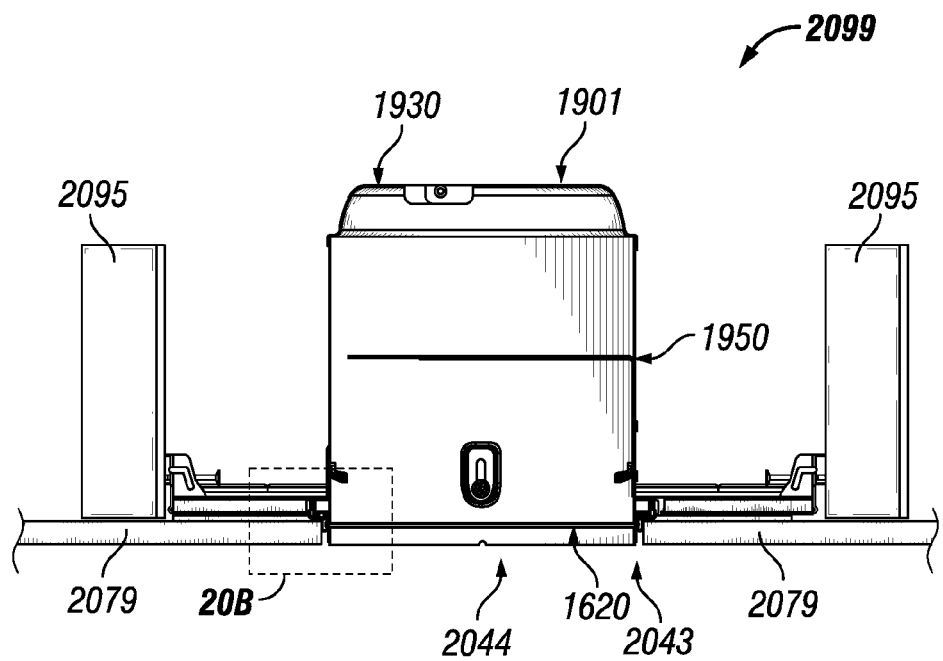
FIGS. 20A and 20B show a lighting system that includes the luminaire of FIGS. 19A-19D in accordance with certain example embodiments.
Figure 20B:
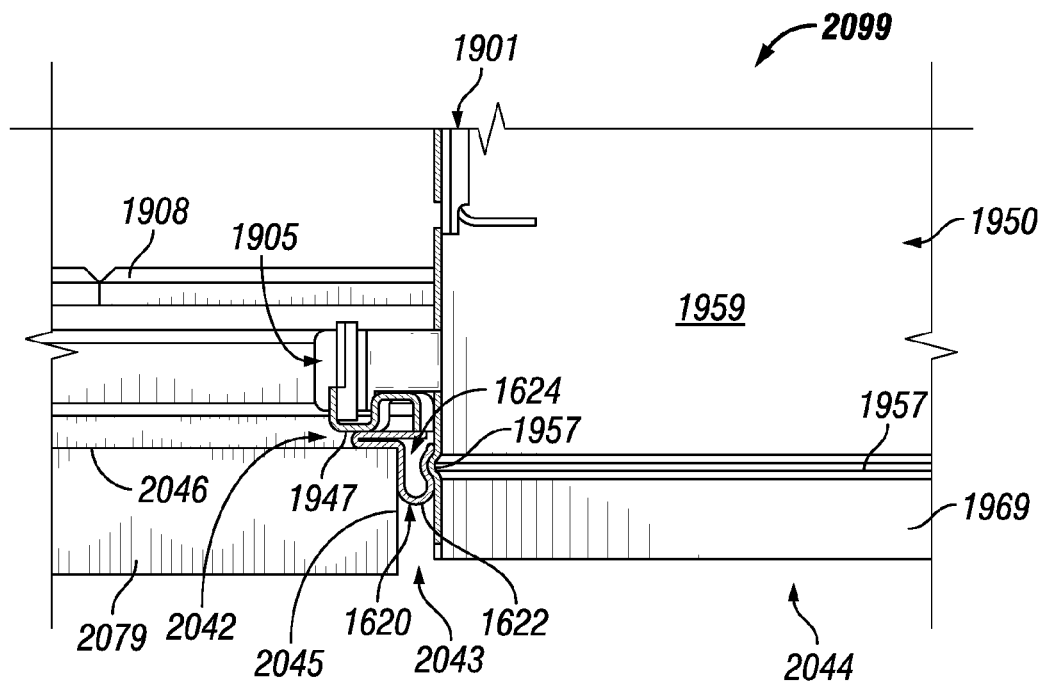

FIGS. 20A and 20B show a lighting system 2099 that includes the luminaire 1901 of FIGS. 19A-19D in accordance with certain example embodiments. Specifically, FIG. 20A shows a side view of the lighting system 2099. FIG. 20B shows a cross-sectional side view of a detailed portion of the lighting system 2099. In one or more embodiments, one or more of the components shown in FIGS. 20A and 20B may be omitted, added, repeated, and/or substituted. Accordingly, embodiments of a lighting system should not be considered limited to the specific arrangements of components shown in FIGS. 20A and 20B. Referring to FIGS. 1-20B, in addition to the luminaire 1901 of FIGS. 19A-19D, the lighting system 2099 of FIGS. 20A and 20B includes one or more space dividing members 2079 (substantially similar to the space dividing members 1579 described above) and one or more mounting members 2095. A mounting member 2095 can be any of a number of components (e.g., a wood stud, a metal beam) to which a luminaire (e.g., luminaire 1901) and/or a space dividing member (e.g., space dividing member 2079) can be coupled. In this case, the each mounting member 2095 of FIG. 20A is coupled to a hangar bar fastener 1909 of the luminaire 1901 and a space dividing member 2079.

The space dividing member 2079 can include an outer side surface 2045 and an outer top surface 2046. The outer side surface 2045 can be created when a user cuts a hole 2044 in the space dividing member 2079. In such a case, the hole 2044 can have a shape that is substantially the same as the shape of the outer perimeter of the lower wall 1969 of the housing body 1950. Further, the hole 2044 can have a size (e.g., a diameter, an outer perimeter) that is slightly larger than the size of the outer perimeter of the lower wall 1969 of the housing body 1950. In such a case, when the luminaire 1901 is installed, there is a gap 2043 between the outer perimeter of the lower wall 1969 of the housing body 1950 and the outer side surface 2045 of the space dividing member 2079.

In certain example embodiments, the width of the gap 2043 is less than the width (the distance between the outer perimeter 1624 and the inner perimeter 1625) of the sealing member 1620 when the sealing member 1620 is in a normal state. In this way, when the sealing member 1620 is disposed around the housing body 1950 (such as the coupling feature 1957, as discussed above with respect to FIGS. 19A-19D), a portion of a wall 1622 of the body 1621 of the sealing member 1620 abuts against the outer side surface 2045 of the space dividing member 2079.

In such a case, the cavity 1624 formed by the body 1621 of the sealing member 1620 is further deformed, as shown in FIG. 20B. As a result, an air-tight seal can be created between the sealing member 1620 and the outer side surface 2045 of the space dividing member 2079. Since an air-tight seal is also created between the sealing member 1620 and the housing body 1950 of the luminaire 1901, the sealing member 1620 restricts air from traversing through the gap 2043 to make the gap 2043 "air tight".

In certain example embodiments, the sealing member 1620 can also be disposed in a gap 2042 formed between a bottom surface 1947 of the frame 1905 of the luminaire 1901 and the outer top surface 2046 of the space dividing member 2079. Specifically, a portion of one or more walls 1622 of the body 1621 of the sealing member 1620 can be disposed between the bottom surface 1947 of the frame 1905 of the luminaire 1901 and the outer top surface 2046 of the space dividing member 2079. In such a case, the cavity 1624 formed by the body 1621 of the sealing member 1620 is still further deformed, as shown in FIG. 20B.

As a result, an air-tight seal can be created between the sealing member 1620 and the outer top surface 2046 of the space dividing member 2079, as well as between the sealing member 1620 and the bottom surface 1947 of the frame 1905. Thus, the sealing member 1620 can restrict air from traversing through the gap 2042 to make the gap 2042 "air tight". In certain example embodiments, the sealing member 1620 is made of a material that can withstand various conditions (e.g., excessive heat, excessive cold, dust, moisture, being in a deformed shape for extended periods of time) for excessive periods of time (e.g., years, decades) without significant wear or degradation. In other words, the sealing member 1620 can be made of sufficient material to maintain an air-tight seal in the gap 2043 and the gap 2042 for long periods of time under conditions to which the luminaire 1901 can normally be exposed.

Certain example embodiments provide a number of benefits. Examples of such benefits include, but are not limited to, use of fewer materials, simplified installation, simplified inspection, simplified maintenance, installation of a luminaire in relatively small spaces, and reduced cost. Example housings and related components described herein also allow for increased flexibility for manufacturing, installing, and/or maintaining a luminaire. Specifically, example sealing members allow for ease of installation while providing an air-tight condition between the luminaire and the space dividing member.

Although embodiments described herein are made with reference to example embodiments, it should be appreciated by those skilled in the art that various modifications are well within the scope and spirit of this disclosure. Those skilled in the art will appreciate that the example embodiments described herein are not limited to any specifically discussed application and that the embodiments described herein are illustrative and not restrictive. From the description of the example embodiments, equivalents of the elements shown therein will suggest themselves to those skilled in the art, and ways of constructing other embodiments using the present disclosure will suggest themselves to practitioners of the art. Therefore, the scope of the example embodiments is not limited herein.

What is claimed is:

1. A sealing member for a luminaire, the sealing member comprising:
    a continuous body comprising at least one sealing member wall, wherein the at least one sealing member wall comprises an elastomeric material,
    wherein the at least one sealing member wall forms a cavity, wherein the cavity has a first shape when the continuous body is uncompressed and a second shape when the continuous body is compressed,
    wherein the continuous body has an inner perimeter that defines an aperture, wherein the aperture is configured to receive a housing of the luminaire, wherein the continuous body is configured to abut against and form a first air-tight seal with an outer surface of the housing wall of the luminaire, wherein the cavity formed by the at least one sealing member wall has the second shape when the continuous body abuts against the outer surface of the housing wall.

2. The sealing member of claim 1, wherein the first shape is substantially triangular.

3. The sealing member of claim 1, wherein the aperture formed by the inner perimeter of the continuous body substantially forms a circle having a first diameter defined by the inner perimeter, wherein the housing wall substantially forms the circle and has a second diameter defined by the outer surface, and wherein the second diameter is greater than the first diameter.

4. The sealing member of claim 1, further comprising:
an extension coupled to and disposed at an inner surface of the at least one sealing member wall of the continuous body, wherein the extension is configured to abut against the outer surface of the housing wall of the luminaire.

5. The sealing member of claim 1, wherein the continuous body forms the first air-tight seal with the outer surface of the housing wall of the luminaire when the cavity has the second shape.

6. The sealing member of claim 1, wherein the cavity forms a third shape when the continuous body abuts against and forms a second air-tight seal with a first outer surface of a space dividing member.

7. The sealing member of claim 6, wherein the cavity forms a fourth shape when the continuous body abuts against and forms a third air-tight seal between a second outer surface of the space dividing member and a frame of the luminaire.

8. A luminaire, comprising:
a housing comprising a housing body with at least one housing wall having an outer perimeter that forms a first shape; and
a sealing member disposed over a portion of the at least one housing wall, wherein the sealing member comprises:
a continuous body comprising at least one sealing member wall, wherein the at least one sealing member wall comprises an elastomeric material,
wherein the at least one sealing member wall forms a cavity, wherein the cavity has a first shape when the continuous body of the sealing member is uncompressed and a second shape when the sealing member is compressed,
wherein the continuous body has an inner perimeter that defines an aperture, wherein the inner perimeter of the continuous body is less than the outer perimeter of the at least one housing wall, wherein the continuous body is compressed when the sealing member is disposed over the at least one housing wall, and wherein the sealing member forms a first air-tight seal with the at least one housing wall when the sealing member is disposed over the at least one housing wall.

9. The luminaire of claim 8, wherein the housing further comprises a coupling feature that protrudes from the at least one housing wall, wherein the continuous body of the sealing member is disposed over the coupling feature.

10. The luminaire of claim 8, wherein the sealing member further comprises an extension coupled to and disposed at an inner surface of the at least one sealing member wall of the continuous body, wherein the extension abuts against the outer perimeter of the at least one housing wall.

11. The luminaire of claim 8, further comprising:
a frame coupled to the at least one housing wall of the housing, wherein the sealing member abuts against and forms a second air-tight seal with a bottom surface of the frame.

12. A lighting system, comprising:
at least one space dividing member with a hole disposed therein, wherein the hole has a first inner perimeter that forms a first shape, wherein a distal portion of at least one housing wall is disposed in the hole; and
a luminaire disposed in the hole, wherein the luminaire comprises:
a housing comprising a housing body with the at least one housing wall having an outer perimeter that forms the first shape; and
a sealing member disposed over the distal portion of the at least one housing wall, wherein the sealing member comprises:
a continuous body comprising at least one sealing member wall, wherein the at least one sealing member wall comprises an elastomeric material,
wherein the at least one sealing member wall forms a cavity, wherein the cavity forms a second shape when the continuous body is uncompressed and a third shape when the continuous body is compressed,
wherein the continuous body defines an aperture, and
wherein the at least one housing wall is disposed in the aperture, wherein the sealing member abuts against and forms a first air-tight seal with the outer perimeter of the housing of the luminaire,
wherein the sealing member further abuts against and forms a second air-tight seal with an outer side surface of a space dividing member, and
wherein the cavity formed by the at least one sealing member wall of the continuous body forms the third shape when the first air-tight seal and the second air-tight seal are formed.

13. The lighting system of claim 12, wherein the second shape of the cavity is a triangle.

14. The lighting system of claim 12, wherein the aperture formed by the continuous body, when the continuous body is uncompressed, forms a fourth shape.

15. The lighting system of claim 12, wherein the aperture formed by the continuous body, when the continuous body is uncompressed, forms the first shape.

16. The lighting system of claim 12, wherein the housing of the luminaire further comprises a coupling feature that protrudes from the at least one housing wall, wherein the at least one sealing member wall is disposed over the coupling feature.

17. The lighting system of claim 16, wherein the at least one sealing member wall is further disposed over a bottom wall of the at least one housing wall, wherein the bottom wall is disposed between the coupling feature and a bottom end of the housing.

18. The lighting system of claim 12, wherein the sealing member further comprises an extension coupled to and disposed at an inner surface of the at least one sealing member wall of the continuous body, wherein the extension abuts against the outer perimeter of the at least one housing wall.

19. The lighting system of claim 12, wherein the luminaire further comprises a frame, wherein the sealing member further abuts against and forms a third air-tight seal with a bottom surface of the frame, wherein the cavity formed by the at least one sealing member wall of the continuous body forms a fourth shape when the third air-tight seal is formed.

20. The lighting system of claim 19, wherein the sealing member further abuts against and forms a fourth air-tight seal with an outer top surface of the space dividing member, wherein the cavity formed by the at least one sealing member wall of the continuous body forms a fifth shape when the fourth air-tight seal is formed.

* * * * *